US008676744B2

(12) United States Patent
Candy et al.

(10) Patent No.: US 8,676,744 B2
(45) Date of Patent: Mar. 18, 2014

(54) PHYSICS-BASED, BAYESIAN SEQUENTIAL DETECTION METHOD AND SYSTEM FOR RADIOACTIVE CONTRABAND

(75) Inventors: James V. Candy, Danville, CA (US); Michael C. Axelrod, San Ramon, CA (US); Eric F. Breitfeller, Dublin, CA (US); David H. Chambers, Livermore, CA (US); Brian L. Guidry, Livermore, CA (US); Douglas R. Manatt, Livermore, CA (US); Alan W. Meyer, Danville, CA (US); Kenneth E. Sale, Castro Valley, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 1098 days.

(21) Appl. No.: 12/259,198

(22) Filed: Oct. 27, 2008
(Under 37 CFR 1.47)

(65) Prior Publication Data

US 2010/0030721 A1  Feb. 4, 2010

Related U.S. Application Data

(60) Provisional application No. 60/982,607, filed on Oct. 25, 2007.

(51) Int. Cl.
  *G06F 15/00* (2006.01)
  *G06F 15/18* (2006.01)
(52) U.S. Cl.
  USPC .................................. 706/62; 706/45; 706/46
(58) Field of Classification Search
  None
  See application file for complete search history.

(56) References Cited

U.S. PATENT DOCUMENTS

| 5,376,795 | A | * | 12/1994 | Hasegawa et al. | ........ 250/363.04 |
| 7,711,661 | B2 | * | 5/2010 | Gentile et al. | ................... 706/12 |
| 2004/0099813 | A1 | * | 5/2004 | Eggeling et al. | ........... 250/459.1 |
| 2006/0182327 | A1 | * | 8/2006 | Mundy et al. | ................. 382/132 |
| 2008/0056443 | A1 | * | 3/2008 | Hu et al. | ......................... 378/54 |
| 2008/0240578 | A1 | * | 10/2008 | Gudmundson et al. | ....... 382/218 |

OTHER PUBLICATIONS

Anderson et al., A Probabilistic Derivation of Gamma-Ray Attenuation and Application: Bayesian Mass Estimation with a Low Count Spectrum, Feb. 2006, Pacific Northwest National Laboratory Richland, p. 1-6.*
Sun et al., Photon Counting with Silicon Avalanche Photodiodes, Aug. 1992, Journal of Lightwave Technology, vol. 10 No. 8, p. 1-10.*

(Continued)

*Primary Examiner* — Kakali Chaki
*Assistant Examiner* — Peter Cpughlan
(74) *Attorney, Agent, or Firm* — James S. Tak

(57) ABSTRACT

A distributed sequential method and system for detecting and identifying radioactive contraband from highly uncertain (noisy) low-count, radionuclide measurements, i.e. an event mode sequence (EMS), using a statistical approach based on Bayesian inference and physics-model-based signal processing based on the representation of a radionuclide as a monoenergetic decomposition of monoenergetic sources. For a given photon event of the EMS, the appropriate monoenergy processing channel is determined using a confidence interval condition-based discriminator for the energy amplitude and interarrival time and parameter estimates are used to update a measured probability density function estimate for a target radionuclide. A sequential likelihood ratio test is then used to determine one of two threshold conditions signifying that the EMS is either identified as the target radionuclide or not, and if not, then repeating the process for the next sequential photon event of the EMS until one of the two threshold conditions is satisfied.

6 Claims, 11 Drawing Sheets

(56) References Cited

OTHER PUBLICATIONS

Bouchud et al., Bayesian Statistics in Radionuclide Metrology: Measurement of a Decaying Source, Mar. 2007, IOP Publishing, p. s95-s101.*

Candy et al., Bayesian Processing for the Detection of Radioactive Contraband from Uncertain Measurements, Jun. 2007, IEEE CAMSAP '07, JRNL 232317, p. 1-6.*

Sullivan et al. "Sequential Bayesian Detection: A Model-Based Approach", UCRL-Book-235410, 2007, 11 pages.*

Sale et al. "A Bayesian Sequential Processor Approach to Spectroscopic Portal System Decisions", SPIE Conference, 2007, 14 pages.*

Hero, et al., "Timing Estimation for a Filtered Poisson Process in Gaussian Noise", IEEE Transactions on Information Theory, vol. 37, No. 1, pp. 92-106 (1991).

Bouchet, "A comparative study of deconvolution methods for gamma-ray spectra", Astronomy & Astrophysics, Supplemental Series 113, pp. 167-179 and 182-183, (1995).

Doucet, et al., "Bayesian estimation of state-space models applied to deconvolution of Bernoulli-Gaussian processes", Signal Processing 57, pp. 147-161 (1997).

Meng, et al., "An Inter-comparison of Three Spectral-Deconvolution Alogorithms for Gamma-ray Spectroscopy", IEEE Transactions on Nuclear Science, vol. 47, No. 4, pp. 1329-1336, (Aug. 2000).

Andrieu, et al., "Bayesian Deconvolution of Noisy Filtered Point Processes", IEEE Transactions on Signal Processing, vol. 49, No. 1, pp. 134-146, (Jan. 2001).

Sale et al., "Pulse-Height Spectrum Measurement Expirement for Code Benchmarking: Initial Results", Application of Accelerators in Research and Industry—Sixteenth Int'l Conference, pp. 567-570, (2001).

Razul, et al., "Bayesian model selection and parameter estimation of nuclear emission spectra using RJMCMC", Nuclear Instruments & Methods in Physics Research, pp. 492-509, (2002).

Arulampalam, et al., "A Tutorial on Particle Filters for Online Nonlinear/Non-Gaussian Bayesian Tracking", IEEE Transactions on Signal Processing, vol. 50, No. 2, pp. 174-188, (Feb. 2002).

Djuric, et al., "Particle Filtering", IEEE Signal Processing Magazine, pp. 19-38, (Sep. 2003).

Mazet, et al., "Background removal from spectra by designing and minimising a non-quadratic cost function", Science Direct, Chemometrics and intelligent laboratory systems, 13 pages, (2004).

Jarman, et al., "Sequential Probability Ratio Test for Long-Term Radiation Monitoring", IEEE Transactions on Nuclear Science, vol. 51, No. 4, pp. 1662-1666, (Aug. 2004).

Doucet, et al., "Monte Carlo Methods for Signal Processing", IEEE Signal Processing Magazine, pp. 152-170, (Nov. 2005).

Cappe, et al., "An Overview of Existing Methods and Recent Advances in Sequential Monte Carlo", Proceedings of the IEEE, vol. 95, No. 5, pp. 899-924, (May 2007).

* cited by examiner

PHYSICS-BASED, BAYESIAN SEQUENTIAL DETECTION METHOD AND SYSTEM FOR RADIOACTIVE CONTRABAND

CLAIM OF PRIORITY IN PROVISIONAL APPLICATION

This application claims priority in provisional application filed on Oct. 25, 2007, entitled "Physics-based Detection, Classification and Estimation of Radioactive Contraband: A Distributed/Parallel Solution" Ser. No. 60/982,607, by James V. Candy et al, and incorporated by reference herein.

FEDERALLY SPONSORED RESEARCH OR DEVELOPMENT

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The present invention relates to radionuclide detection methods. More particularly, the invention relates to a distributed sequential signal processing method and system for detecting and identifying radionuclides using a statistical approach based on Bayesian inference combined with physics-based emissions, transport, and detector processing models which represent radionuclides as a monoenergetic decomposition of photons at given energy amplitudes along with interarrival times.

BACKGROUND OF THE INVENTION

Timely and accurate radionuclide detection and identification is a critical capability and first line defense against the transportation of nuclear contraband and potential terrorist threats. However, radionuclide detection can be difficult due to low-count gamma emissions produced when, for example, sources are shielded to disguise their existence or are being transported and in relative motion with respect to the sensors. Moreover, background noise, finite detector resolution, and the heterogeneous media along transport paths between the sources and detectors all compound the measurement difficulty by "burying" the low-count emissions in the background and Compton scattering noise.

Various signal processing tools, techniques, and algorithms are known for detecting and identifying radionuclides from their gamma ray emission signatures produced in a gamma ray energy (probability) distribution or spectrum created as an energy histogram of measured arrival data at various energy levels (count vs. binned energy). In particular, these gamma spectroscopy methods analyze and interpret the energy spectrum to find emissions signatures ("energy lines") uniquely characterizing individual radionuclides. However, these techniques have been known to fail on low-count measurement data, revealing inherent problems in both (a) the underlying physics models of the radiation emissions, transport, and measurement processes used for signal processing, and (2) the underlying mathematical framework for solving the detection problem.

For example, contemporary approaches to radionuclide detection utilize linearized approximations to the nonlinear processors (extended and unscented Kalman filters) which imply underlying Gaussian probabilistic assumptions. Unfortunately the nuclear physics dominating this problem is not characterized by unimodal (one peak) distributions, but rather by multimodal (multiple peaks) representations. Moreover, existing methodologies are based on enhancing the output gamma-ray spectrum by attempting to deconvolve the propagation uncertainties that contaminate the spectrum, i.e. remove background interference and noise, so as to increase the probability of extracting the spectral (energy) lines and identifying the radionuclide of interest. However, it is often the case when used in practice that the low-count detection limitations of contemporary gamma ray spectrometry tools and methods reveal the reliance of the underlying analysis algorithms upon heuristic approaches based upon the experience of analyst, even requiring in some cases the intervention of a trained practitioner to analyze the results and guide the interpretation process. In a terrorist type scenario, this is not acceptable, since timely and accurate performance is imperative. There is therefore a need for a new technique and methodology that provides for more timely, sensitive, and accurate detection of radionuclides that pose a significant terrorist threat.

SUMMARY OF THE INVENTION

One aspect of the present invention includes a photon-by-photon sequential radionuclide detection method comprising, detecting an event mode sequence (EMS) comprising a sequence of measured photon events each uniquely characterized by an energy amplitude-interarrival time parameter pair; for an $n^{th}$ photon event of the EMS: selecting a monoenergy processing channel from a set of parallel monoenergy processing channels derived from a monoenergetic decomposition of a target radionuclide into monoenergetic sources in which to process the $n^{th}$ photon event, said selection based on a determination that both of the energy amplitude and interarrival time values of the $n^{th}$ photon event satisfy respective energy amplitude and interarrival time confidence interval conditions of the selected monoenergy channel; upon selecting the monoenergy channel, using a sequential Bayesian processor of said selected monoenergy channel to update energy amplitude and interarrival time parameter estimates with the measured energy amplitude and interarrival time values of the nth photon event; using the updated amplitude and interarrival time parameter estimates to update a measured probability density function (PDF) estimate for the target radionuclide; determining whether a sequential likelihood ratio satisfies one of two threshold conditions signifying that the EMS is either identified as the target radionuclide or as not the target radionuclide, wherein said sequential likelihood ratio is based on a previous sequential likelihood ratio for a previous $(n-1)^{th}$ photon event, the sum of all updated measured PDF estimates produced as output from the set of parallel monoenergy channels; and the sum of all a-priori PDF estimates which are produced in parallel with the updated measured PDF estimates and based on expected amplitude level and interarrival time values of the target radionuclide; and upon determining that one of the two threshold conditions is satisfied, providing notification of the corresponding result, else repeating from the monoenergy selection step for the next $(n+1)^{th}$ photon event of the EMS until one of the two threshold conditions is satisfied.

Another aspect of the present invention includes a radionuclide detection system comprising: a detector for detecting an event mode sequence (EMS) comprising a sequence of measured photon events each uniquely characterized by an energy amplitude-interarrival time parameter pair; a set of parallel monoenergy processing channels derived from a monoenergetic decomposition of a target radionuclide into monoenergetic sources, each monoenergy processing channel comprising: an energy line discriminator module for determining if an energy amplitude value of an $n^{th}$ photon event satisfies a channel-specific energy amplitude confidence interval condition, and rejecting the photon event if the condition is not satisfied; an interarrival time (rate) discriminator module for determining, based upon acceptance of the photon event by the energy line discriminator module, if an interarrival time value of the $n^{th}$ photon event satisfies a channel-specific interarrival time confidence interval condition, and rejecting the photon event if the condition is not satisfied; an energy amplitude parameter estimator module including a sequential Bayesian processor for updating energy amplitude parameter estimates with the measured energy amplitude and interarrival time values of the nth photon event; an interarrival time (rate) parameter estimator module including a sequential Bayesian processor for updating interarrival time parameter estimates with the measured energy amplitude and interarrival time values of the nth photon event; and a measured probability density function (PDF) estimator module for using the updated amplitude and interarrival time parameter estimates to update a measured probability density function (PDF) estimate for the target radionuclide; a sequential likelihood ratio processor module for determining whether a sequential likelihood ratio satisfies one of two threshold conditions signifying that the EMS is either identified as the target radionuclide or as not the target radionuclide, wherein said sequential likelihood ratio is based on a previous sequential likelihood ratio for a previous $(n-1)^{th}$ photon event, the sum of all updated measured PDF estimates produced in all the monoenergy channels, and the sum of all a-priori PDF estimates which are produced in parallel with the updated measured PDF estimates and based on expected amplitude level and interarrival time values of the target radionuclide, wherein upon determining that one of the two threshold conditions is satisfied the sequential likelihood processor provides notification of the corresponding result; and a channel input module for providing the set of parallel monoenergy processing channels with a next $(n+1)^{th}$ photon event and its energy amplitude-interarrival time parameter pair values for processing until the sequential likelihood ratio processor module determines that one of the two threshold conditions is satisfied.

BRIEF DESCRIPTION OF THE DRAWINGS

The accompanying drawings, which are incorporated into and form a part of the disclosure, are as follows.

DETAILED DESCRIPTION

Figure 2:
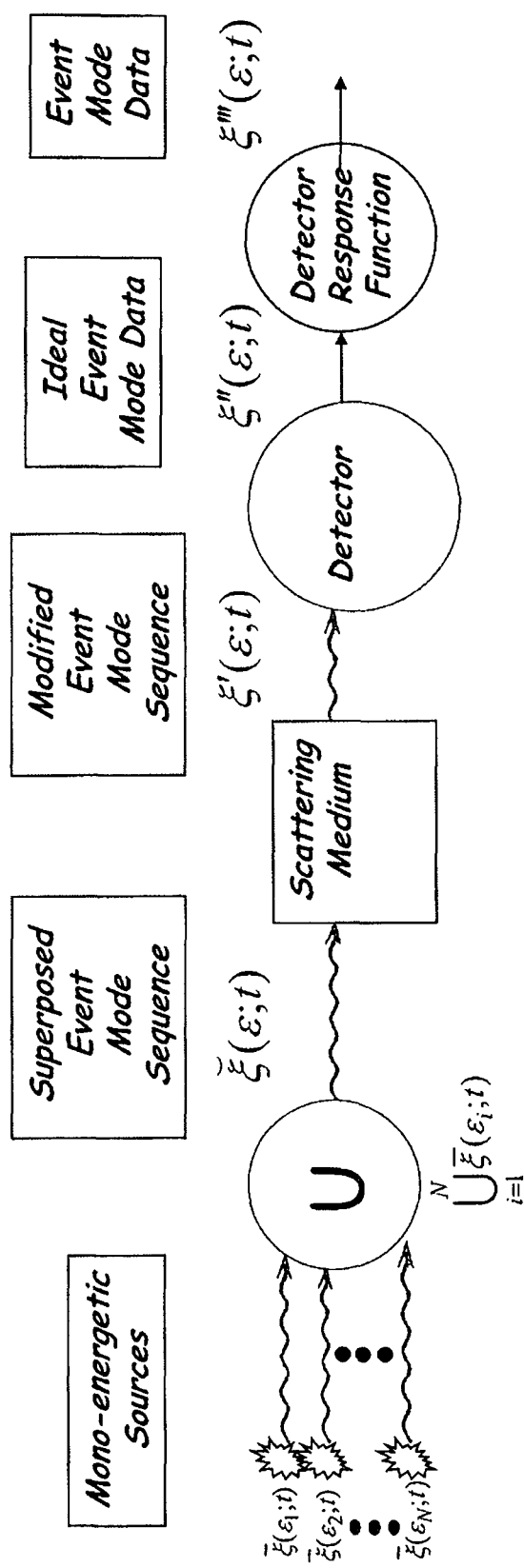
FIG. 2 shows a schematic view of gamma-ray evolution from a monoenergetic source, a scattering/transport medium, and a detector, and detector response function.

The present invention relates to a sequential radionuclide detection method and system for detecting and identifying radioactive contraband from highly uncertain (noisy) low-count, radionuclide measurements using a statistical approach based on Bayesian inference, and incorporating physics-based statistical models of the emissions, transport, and measurement processes that capture the essence of this radiation detection problem. In particular, the method and system of the present invention models the source radionuclides by decomposing them uniquely as a superposition (union) of monoenergetic sources that are then smeared and distorted as they are transported through the usual path to the detector for measurement and counting as illustrated in FIG. 2. The measured data consists of a low energy count, impulsive-like, time series measurements (energy vs. time) in the form of an event mode sequence (EMS) obtained from pulse shaping circuitry [2]. The problems of interest are then defined in terms of this unique, orthogonal representation in which solutions based on extracting this characterization from uncertain detector measurements can be postulated. The inclusion of a basic radionuclide representation as a monoenergetic decomposition of photons at given energy levels or amplitudes along with interarrival times is used to extract the physics information available from the uncertain measurements. Not only does this decomposition lead to a "physics-based" structure that can be used to develop an effective detection technique, but it also leads to the implementation this approach using advanced signal processing methodologies such as sequential Monte Carlo processors or equivalently particle filters to enhance and extract the required information. Starting with this physics-based representation of nuclides as a monoenergetic decomposition, a Bayesian probabilistic framework is developed to theoretically define and solve the problem. The key idea is to process the data, photon-by-photon, rejecting any extraneous non-targeted radionuclide measurements and processing only those that correspond to the target contraband. As described herein, the present invention pertained only to photo-peaks, with Compton scattered photons being rejected. In general, the Bayesian approach-based framework of the present invention is applicable to many other problems of national security interests, other than radionuclide detection. By posing such problems within this statistical framework the detection method of the present invention may also potentially be used in the detection in weapons of mass destruction (biological, chemical, nuclear) detection (i.e. are they present?), classification (i.e. if present, what are they?), and identification/estimation (i.e. how much of each?).

In Section A., development of the physics-based signal processing models employed in the subsequent Bayesian constructs is described. In particular, the monoenergetic representation is first modeled, followed by more of the instrumentation and noise into the measurement model. Based on this representation the overall probabilistic design is described in Section B. illustrating how the sequential Bayesian detector design evolves naturally from the underlying source physics. In Section C. a preferred embodiment of the signal processing solution of the present invention to the processing problem is described as well as a sequential detection and classification scheme. Section D is the Appendix including the statistics of EMS, and particle filtering. And Section F are the References incorporated by reference herein.

A. PHYSICS-BASED PROCESSING MODELS

As a preliminary matter, it is well-known that a particular radionuclide can be uniquely characterized by two basic parameters: its energy amplitude levels emitted in the form of photons or gamma-rays (γ-rays) and its radioactive decay rate which is directly related to its arrival time [2]. Knowledge of one or both of these parameters provides a unique representation of a radionuclide. Mathematically, we define the pair, $[\{\epsilon_m\}, \{\lambda_m\}]$, as the respective energy level (MeV) and decay rate (probability of disintegration/nuclei/sec) of the $m^{th}$-component of the elemental radionuclide. Although either of these parameters can be used to uniquely characterize a radionuclide, only one is actually necessary—unless there is uncertainty in extracting the parameter.

The present invention uses statistical models of both emission and measurement processes that can effectively be used in the Bayesian framework. The underlying probability distributions of photon events describe the physics of the radiation transport between the source and the detector. Furthermore, these stochastic models of the physical process must incorporate the loss of information resulting from the absorption of energy between an ideal source and the detector.

Semiconductor (high purity germanium or sodium iodide) energy detectors are designed to measure the γ-ray energy from the electron current induced by the energy deposition of the incoming photons in the detector material. A typical detector is plagued with a variety of extraneous measurement uncertainties that create inaccuracy and spreading of the measured current impulse (and therefore γ-ray energy). The evolution of a γ-ray as it is transported through the medium and interacts with materials, shield and the detector is shown in FIG. 2. It is important to realize that in the diagram, the source radionuclide can be represented by its constituents in terms of monoenergetic (constant energy amplitude) components and arrival times as $\xi(\epsilon_m, \tau_m)$. Since this representation of the source radionuclide contains the constituent energy amplitude levels and timing, then all of the information is completely captured by the sets, $[\{\epsilon_m, \{\tau_m\}\}]$, m=1, . . . $M_\epsilon$. The source arrivals can be used to extract the corresponding set of decay constants, $\{\lambda_m\}$ which are related [2]. Thus, from the detector measurement of the individual photon arrivals or equivalently the entire EMS, a particular radionuclide can be uniquely characterized. The constituent energy amplitude levels, $\{\epsilon_m\}$ and arrival times, $\{\tau_m\}$ extracted from the EMS are depicted in fx. 3 where we show the union (superposition) of each of the individual constituent monoenergetic sequences composing the complete radionuclide FMS. Note that there is no overlapping of arrivals—a highly improbable event.

So we see that the signal processing model developed from the evolution of the γ-ray as it is transported and deposited in the detector semiconductor material is measured and evolves as a distorted EMS. With these parameters, most threat radionuclides and their corresponding composition are well-known and can be applied in a variety of problem formulations. Thus, we are taking a model-based approach based on Bayesian inference to solve a suite of radiation detection problems, that is, the estimation of the underlying posterior probability distribution governing the γ-ray emission process in terms of the individual models and parameters.

A.1. Event Mode Sequence

A more detailed mathematical representation of the event mode sequence is developed here in terms of its monoenergetic decomposition. From this decomposition, the basic signal processing model is then developed in terms of the random processes that govern its evolution. We start with a single γ-ray or photon arrival and then incorporate a set of monoenergetic source components that uniquely characterize the complete radionuclide. Finally we expand the model to a full emission sequence from the radionuclide source.

Define $\xi(n; \epsilon_m, \tau_m)$ as the component of an EMS sequence as the $n^{th}$-arrival from the $m^{th}$-monoenergetic source of energy level (amplitude), $\epsilon_m(n)$ and arrival time, $\tau_m(n)$ with associated decay rate $\lambda_m(n)$—as a single photon impulse sample, that is, $$\xi(n; \epsilon_m, \tau_m) = \epsilon_m(n)\delta(t - \tau_m(n)) \text{ and source rate } \lambda_m(n) \quad (1)$$

The ideal FMS is composed of sets of energy-arrival sample pairs, $\{\epsilon_m(n), \tau_m(n)\}$. We could visualize this energy exchange as a photon depositing its energy in the detector material and the pair of unique energy-arrival parameters being extracted by the measurement system.

Figure 3:
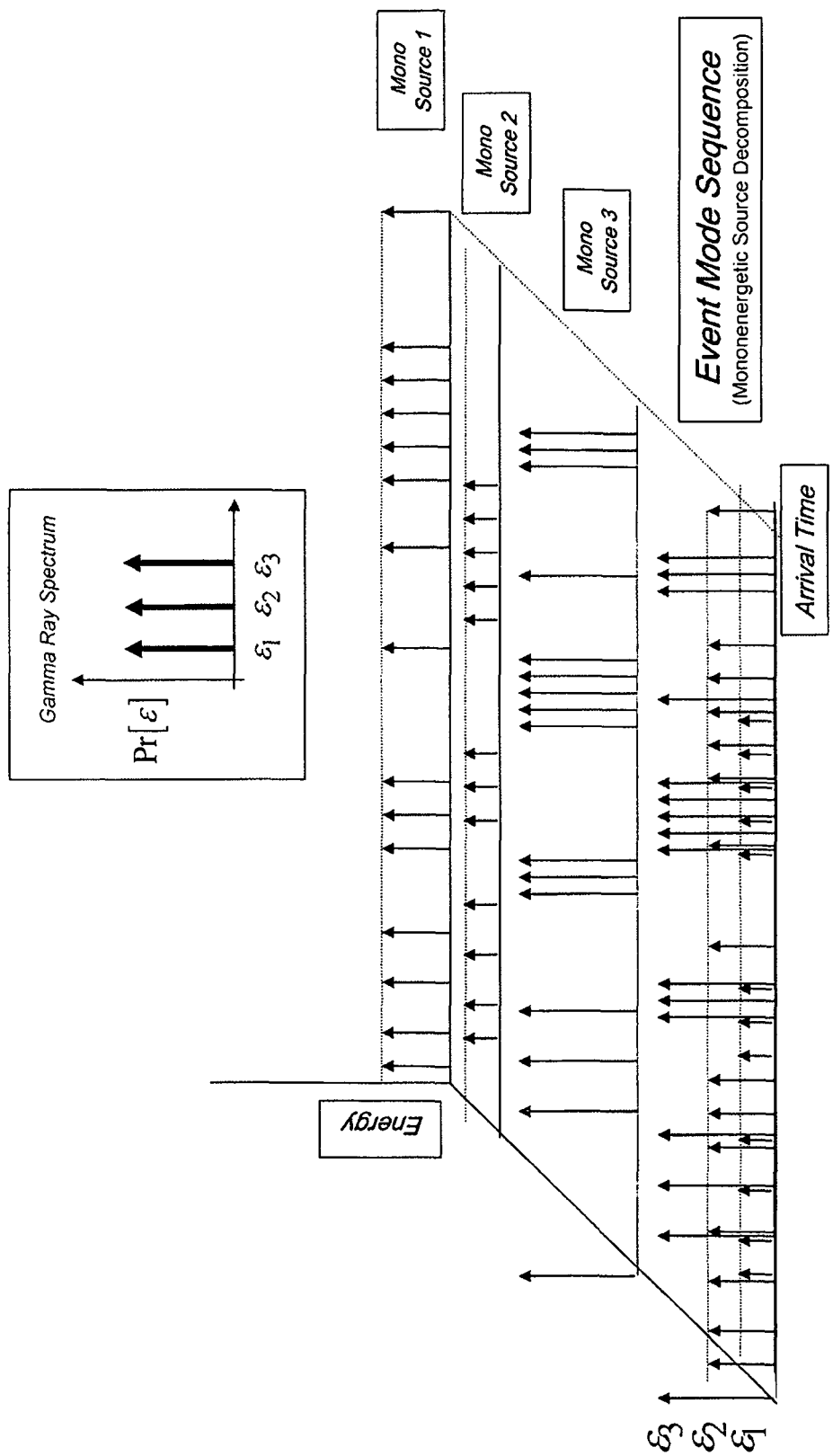
FIG. 3 shows the monoenergetic source decomposition: individual constituent EMS and ideal composite-free EMS.

In order to define the entire emission sequence over a specified time interval, $[t_o, Y)$, we introduce the set notation, $\tilde{\tau}_m := \{\tau_m(1) \ldots \tau_m(N_\epsilon(m))\}$ at the $n^{th}$-arrival with $N_\epsilon(ii)$ the total number of counts for the $m^{th}$-source in the interval. Therefore, $\xi(n; \epsilon_m, \tilde{\tau}_m)$ results in a unequally-spaced impulse train given by (see FIG. 3)

$$\xi(n; \varepsilon_m, \tilde{\tau}_m) = \sum_{n=1}^{N_\varepsilon(m)} \xi(n; \varepsilon_m(n), \tau_m(n)) = \sum_{n=1}^{N_\varepsilon(m)} \varepsilon_m(n)\delta(t - \tau_m(n)) \quad (2)$$

at rate $\lambda_m(n)$

The interarrival time is defined by $\Box\tau_m(n) = \tau_m(n) - \tau_m(n-1)$ for $\Box\tau_m(0) = t_o$ with the corresponding set definition (above) of $\Box\tau_m(n)$. Using this definition, we can rewrite the EMS in terms of interarrivals just as easily as arrival times, that is, $$\xi(n; \varepsilon_m, \Box\tilde{\tau}_m) = \sum_{n=1}^{N_\varepsilon(m)} \xi(n; \varepsilon_m(n), \Box\tau_m(n)) = \sum_{n=1}^{N_\varepsilon(m)} \varepsilon_m(n)\delta(t - \Box\tau_m(n)) \quad (3)$$

and rate $\lambda_m(n)$ for $t_o$ known. Again note that both $\tau_m(n)$ and $\Box\tau_m(n)$ are unequally-spaced.

We summarize the monoenergetic source representation of a radionuclide source characterized by its unique set of energy/interarrival pairs, $\{\epsilon_m, \Delta\tau_m\}$ (or equivalently as its energy/decay rate pairs, $\{\epsilon_m, \lambda_m\}$)

$$\xi(n; \varepsilon_m, \Delta\tilde{\tau}_m) = \sum_{n=1}^{N_\varepsilon(m)} \varepsilon_m(n)\delta(t - \Delta\tau_m(n)) \text{ and rate } \lambda_m(n) \quad (4)$$

Let us extend this EMS model from a single monoenergetic representation to incorporate a set of $M_\epsilon$-monoenergetic sources that compose a complete source radionuclide. Suppose we have a radionuclide source whose EMS is decomposed into its $M_\epsilon$-monoenergetic source components, $\xi(n;\epsilon,\Delta\tau)$. From the composition of the EMS we know that $$\xi(n; \varepsilon, \Delta\tilde{\tau}) = \bigcup_{m=1}^{M_\varepsilon} \xi(n; \varepsilon_m, \Delta\tilde{\tau}_m) \Leftrightarrow \sum_{m=1}^{M_\varepsilon} \xi(n; \varepsilon_m, \Delta\tilde{\tau}_m) \quad (5)$$

where the last equivalence results from the pragmatic assumption that it is highly improbable that any two arrival will overlap. Thus it follows from Eq. 1 that a complete radionuclide can be represented in terms of its monoenergetic decomposition as $$R_\eta(n; \underline{\varepsilon}, \Delta\underline{\tau}) = \sum_{m=1}^{M_\varepsilon} \sum_{n=1}^{N_\varepsilon(m)} \xi(n; \varepsilon_m(n), \Delta\tau_m(n)) = \sum_{m=1}^{M_\varepsilon} \sum_{n=1}^{N_\varepsilon(m)} \varepsilon_m(n)\delta(t - \Delta\tau_m(n)) \quad (6)$$

We summarize the EMS monoenergetic source representation (using the previous definitions of Eq. 4) as:

$$R_\eta(n; \underline{\varepsilon}, \Delta\underline{\tau}) = \sum_{m=1}^{M_\varepsilon} \sum_{n=1}^{N_\varepsilon(m)} \varepsilon_m(n)\delta(t - \Delta\tau_m(n)) \quad (7)$$

where $R_\eta(n;\underline{\epsilon},\Delta\underline{\tau})$ is the composite EMS of the radionuclide $M_\epsilon$ is the number of monoenergetic source components in the composite EMS $N_\epsilon(m)$ is the number (counts) of arrivals from the $m^{th}$-monoenergetic source component in the time-interval, $[t_o,T)$ $\epsilon_m(n)$ is the $n^{th}$-arrival of γ-ray energy (amplitude) level of the $m^{th}$-monoenergetic component in the time-interval of the composite EMS $\Delta\tau_m(n)$ is the $n^{th}$ interarrival time of the $m^{th}$-monoenergetic component in the time interval of the composite EMS Of course, this representation can be extended even further to capture a set of radionuclides. If we account for this set, that is, $$R_\eta(n;\underline{\epsilon},\Delta\underline{\tau}) \to R_{\eta l}(n;\underline{\epsilon},\Delta\underline{\tau}) \text{ for } l=1,\ldots,L_R$$

Then this characterization implies the following changes to other critical components as:

$$\xi_{ml}(t) \to \xi_{ml}(t); \epsilon_m \to \epsilon_{ml}; \Delta\tau_{ml}; \text{and } M_\epsilon \to M_{\epsilon_l}$$

therefore, we have that Eq. 7 becomes $$R_\eta(n; \underline{\varepsilon}, \Delta\underline{\tau}) = \sum_{l=1}^{L_R} R_{\eta l}(n; \underline{\varepsilon}, \Delta\underline{\tau}) = \sum_{l=1}^{L_R} \sum_{m=1}^{M_{\varepsilon_l}} \sum_{n=1}^{N_\varepsilon(ml)} \varepsilon_{ml}(n)\delta(t - \Delta\tau_{ml}(n)) \quad (8)$$

So we see that an entire set of radionuclides can be decomposed as:

$$R_\eta(n;\underline{\epsilon},\Delta\underline{\tau}) \to \{R_{\eta l}(n;\underline{\epsilon},\Delta\underline{\tau})\} \to \{\xi(n;\epsilon_{ml}(n), \Delta\tau_{ml}(n))\} \to \{\epsilon_{ml}(n), \Delta\tau_{ml}(n)\}$$

This unique physics-based representation provides the basis to develop signal models for subsequent processing. The underlying statistics of the EMS are discussed in Appendix A. Next we consider the measurement of the EMS along with its inherent uncertainties.

A.2. Detector Measurements

Using the mathematical description of the EMS in terms of its monoenergetic source decomposition model discussed previously, we show how this ideal representation must be modified because of the distortion and smearing effects that occur as the γ-rays propagate according to the transport physics of the radiation process.

In our modeling we will only consider the pulse-mode of detector (semiconductor) operation, which is the most common employed in γ-ray detection, since both amplitude and arrivals are measured [2]. Amplitude variations are typically expressed in terms of the differential pulse height (amplitude) distribution which is a direct representation of the uncertainty in measuring the energy level. This distribution is commonly called the detector response function [2] and can be modeled in terms of our monoenergetic source amplitude (energy amplitude level). Here the detector response characterizes the energy deposited in the detector material scaled to produce the equivalent charge (current) at the pulse amplifier input.

The basic construct of a γ-ray detector starts with the material selected. We concentrate on semiconductor materials, primarily Ge and SiI; therefore, the applications discussed are based on these materials focusing on Ge, since it provides the most outstanding performance enabling us to upper bound our results. The spectrometer measurement device is generally constructed to provide a histogram or equivalently spectrum of the counts (probability) versus γ-ray energy and has heavily been depended upon for detection of threat materials and devices.

As the γ-rays penetrate the Ge material interaction energy from the detector material is converted from a charge or current pulse to a voltage pulse (v=q/C) that is then conditioned, amplified, quantized and ultimately converted to an equivalent voltage to extract the required energy count and timing information. Uncertainties created by the detector material and the γ-ray interaction process are influential in characterizing the overall energy resolution ($\Delta\epsilon$) capability. Typically, these are quantified in terms of γ-ray spectral properties of energy "peak width" and "peak amplitude." The uncertainties evolve from three factors inherent in the material and instrumentation; inherent statistical spread in the number of charge carriers, variations in the charge collection efficiency and electronic noise [2].

Next consider the uncertainties created in the associated measurement system that consists of a pre-amplifier and pulse shaping circuit. The pre-amplifier amplifies the amplitude of the collected detector current preserving its relationship to the photon deposition energy—this is where the actual energy physics is transformed into electrical signals. The output of the pre-amplifier carries not only the quantified γ-ray energy amplitude information ($\epsilon_m$) enabling a single event mode impulse characterization associated with the monoenergetic decomposition, but also the arrival time ($\tau_m$) used for the detector timing circuits (gating pulses, logic pulses, etc.). This information is then converted to a Gaussian-shaped pulse in order to extract the photon energy amplitude and timing information (arrival times, interarrival times, etc.)—a very clever ADC system. Note, however, that the actual "physics" (charge vs. time) is preserved at the output of the pre-amplifier not at the output of the shaper, since it basically gives a digitized version of $\{\epsilon_m, \tau_m\}$—the EMS or so-called "list" mode [2]. Thus, the pulse shaping circuitry transforms the "raw" charging current and shapes it into a Gaussian pulse [2]. Once the Gaussian pulse is created, the critical EMS parameters, $[\{\epsilon_m\},\{\tau_m\}]$, can be extracted for further analysis and processing (energy histogram). There are a wide variety of pulse shaping circuits both active and passive that can be applied to this problem [2]; however, the most popular is the Gaussian pulse shaper.

Timing is a critical issue especially if we are interested in extracting decay rates accurately. Timing resolution is limited by two dominant factors: collection process time and random pulse shapes [2]. Collection process time is the time to collect the charge from the material after the $\gamma$-ray interaction. It is slow (100 ns in Ge) increasing the rise time of the pulse shaper. Pulse shape (rise) differs substantially in Ge detectors especially from pulse-to-pulse (event-to-event) creating large leading edge variations of the pulse [2]. This variation creates uncertainty, say jitter, in most timing circuits.

Figure 1:
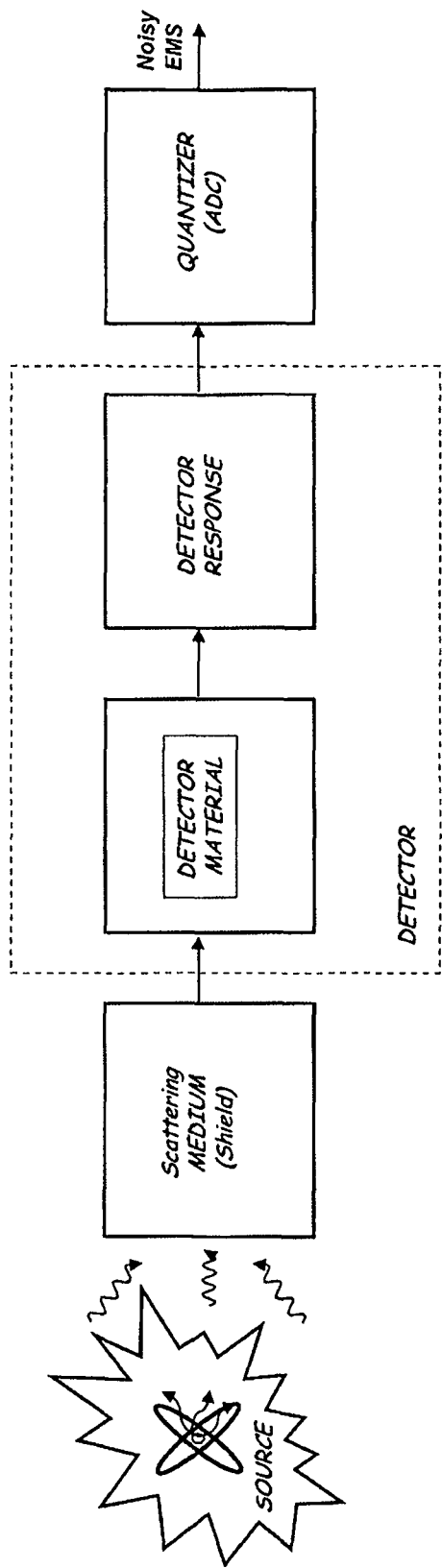
FIG. 1 shows a schematic view of an overall radiation detection and signal processing model, illustrating gamma-ray evolution and measurement, and including the radionuclide source (EMS), medium transport (physics), detector material interaction, detector temporal response (pre-amplification/pulse shaping) and ADC conversion with quantization noise.

Next we define a signal processing model that captures the major characteristics of a solid state detector in order to subsequently formulate the model-based approach to the radiation detection problem. Consider the diagram again of the overall detector system shown in FIG. 1. Here we see how the photon is transported to the detector and interacts with its material (scattering and attenuation) creating a charge and then passes onto pulse shaping electronics that are contaminated with random instrumentation noise followed by the quantization to produce the noisy output. The $\gamma$-ray interacts with the solid state material and a charge is created proportional to its energy. We model this pre-amplifier output as random created by the intrinsic material property uncertainties in the form of the unknown number of charge carriers and charge collection efficiency (process noise). We lump the material uncertainties into an additive noise process. Thus, the measured $n^{th}$-interarrival of the $m^{th}$-monoenergetic component can be characterized by $$p_m(n) = \xi(n;\epsilon_m, \Box\tilde{\tau}_m) + w_{\Box\tau_m}(n) = \epsilon_m(n)\delta(t-\Box\tau_m(n)) + w_{\Box\tau_m}(n) \quad (9)$$

where the uncertain energy amplitude level is assumed Gaussian, $\epsilon \Box N(\overline{\epsilon}_m, \sigma_{\epsilon_m}^2)$, with inherent uncertainty representing the material charge collection process time "jitter" by the additive zero-mean, Gaussian noise, $$w_{\Box\tau_m} \Box N(\Box\tau_i, \sigma_{w_{\Box\tau_m}}^2).$$

Next we investigate the use of these models in Bayesian processor designs.

B. BAYESIAN DETECTOR DESIGN

In this section we discuss the physics-motivated design of a Bayesian detector of the present invention for the radiation detection problem based on extracting the critical radionuclide parameters from the EMS using the monoenergetic physics and detector measurement models developed in the previous section. Since our goal is for a real-time system, we process each photon arrival individually requiring a "sequential" processor. First we discuss the overall structure of the algorithm motivated by the photon transport and detector measurements. We briefly discuss the development of the underlying theory and mathematics for the implementation of the sequential Bayesian processor. The main idea is to develop the device from a "bottoms-up" approach in which we process each photon individually as it is collected rather than wait for an entire EMS to be gathered. This concept is typical of the usual data acquisition techniques and enables sequential processing. After the single photon is processed by the acquisition system, the extracted parameters are enhanced and passed onto the energy/rate discriminators to "decide" on the photon's status (line/rate, Compton, reject). If acceptable, the probability density function estimates are sequentially updated and provided as input to the radionuclide detector.

Since we know all of the measurement data and required parameters evolve from the EMS, we are in search of an estimator and inherent structure that enables us to "decide" when a particular target radionuclide is present or not. We start with estimating the posterior distribution (or its equivalent) from the uncertain data, that is, $$Pr(R_n(n;\underline{\epsilon}, \Box\underline{\tau})|\Xi_n) \Leftrightarrow Pr(\underline{\epsilon}, \Box\underline{\tau}|\Xi_n)$$

for $\underline{\epsilon} := \{\epsilon_1(n), \ldots, \epsilon_{M_\epsilon}(n)\}$, the set of complete energy amplitude levels composing $R_n$ along with $\Box\underline{\tau} := \{\Box\tau_1(n), \ldots, \Box\tau_{M_\epsilon}(n)\}$, the corresponding set of interarrival times with $\Xi_n := \{\xi(1), \ldots, \xi(n)\}$, the set of EMS measurements including the $n^{th}$-interarrival.

Unfortunately, the basic radionuclide physics is more complicated, since the emission of monoenergetic photons follows a well-defined probability structure, that is, all monoenergetic photons are not present in the EMS during an individual event (single photon arrival) only one of the energy amplitude levels is present as dictated by its probability of occurrence ($\alpha_i$) associated with its inherent structure as specified in its energy decay diagram [2]. Therefore, we model this decay structure by a Markov chain model incorporating an indicator function defined by:

$$I_j(m) = \begin{cases} 1 & m = j \\ 0 & m \neq j \end{cases}$$

where $I_j(m)$ is a random variable such that $Pr(I_j(m)=1)=\alpha_j$ and $\alpha_j$ is the corresponding probability of occurrence of the $j^{th}$-monoenergetic RN component.

Motivated by this additional physics information based on the energy level diagrams of various radionuclides [2], we can model the radionuclide by its monoenergetic decomposition embedding the corresponding indicator function, $I_j(m)$, such that $$R_\eta(n;\underline{\varepsilon}, \Delta\underline{\tau}) = \sum_{m=1}^{M_\varepsilon} \sum_{n=1}^{N_\varepsilon(m)} I_j(m)\varepsilon_m(n)\delta(t-\Delta\tau_m(n)) \quad (10)$$

and therefore, for the $j^{th}$-monoenergetic source we have $$\xi(n; \varepsilon_m, \Delta\tau_m)|_{m\to j} = \sum_{n=1}^{N_\varepsilon(j)} \varepsilon_j(n)\delta(t - \Delta\tau_j(n)) \quad (11)$$

With this in mind, the required radionuclide posterior distribution can be decomposed in terms of each arrival pair $(\varepsilon_j(n), \Box\tau_j(n))$ along with its associated probability of occurrence, $\alpha_j$, that is, $$Pr(R_\eta(n;\underline{\varepsilon},\Box\underline{\tau}|\Xi_n) = Pr(\underline{\varepsilon}(n),\Box\underline{\tau}(n),I_j(m)|\Xi_n) \quad (12)$$

Applying Bayes' rule we obtain $$Pr(R_\eta(n; \underline{\varepsilon}, \Box\underline{\tau})|\Xi_n) = Pr(\Box\underline{\tau}(n)|\underline{\varepsilon}(n), I_j(m), \Xi_n) \times \quad (13)$$
$$Pr(\underline{\varepsilon}(n), I_j(m)|\Xi_n)$$
$$= Pr(\Box\underline{\tau}(n)|\underline{\varepsilon}(n), I_j(m), \Xi_n) \times$$
$$Pr(\underline{\varepsilon}(n)|I_j(m), \Xi_n) \times$$
$$Pr(I_j(m)|\Xi_n)$$

For an individual photon arrival and therefore the corresponding energy-interarrival pair, we have only one monoenergetic source amplitude level, say the $j^{th}$, occurring according to the probability law, $\alpha_j$; the corresponding probability is $$Pr(R_\eta(n;\varepsilon_j,\Box\tau_j)|\Xi_n) \to \alpha_j \times Pr(\varepsilon_j(n),\Box\tau_j(n)|\Xi_n) \quad (14)$$

which can be decomposed further using Eq. 13 to give $$Pr(R_\eta(n;\varepsilon_j,\Box\tau_j)|\Xi_n) \to \alpha_j \times Pr(\Box\tau_j(n)|\varepsilon_j(n),\Xi_n) \times Pr(\varepsilon_j(n)|\Xi_n) \quad (15)$$

The posterior radionuclide probability can be estimated photon-by-photon and therefore evolves to the following processor:
1. Given the "truth": $[\{\alpha_m\}, \{\varepsilon_m\}, \{\Box\tau_m\}]$; m=1, ..., $M_\varepsilon$ (from Tables);
2. Determine the $j^{th}$-monoenergetic component with $Pr(I_j(m)=1)=\alpha_j$, decide which energy-interarrival pair $(\varepsilon_j, \Box\tau_j)$;
3. Given m=j and the data $\Xi_n$, estimate the energy amplitude distribution: $Pr(\varepsilon_j(n)|\Xi_n)$;
4. Given $\varepsilon_j(n)$ and the data $\Xi_n$, estimate the interarrival distribution: $Pr(\Box\tau_j(n)|\varepsilon_j(n), \Xi_n)$;
5. Update the radionuclide posterior distribution $Pr(R_\eta(n; \varepsilon_j, \Box\tau_j)|\Xi_n)$ using Eq. 13; and
6. Decide if this estimated mixture "matches" the target radionuclide distribution.

It is the joint relation of Eq. 13 that motivates the design of the processor. We note first that in this construct the interarrival times are conditioned on the energy amplitude levels and data implying that we first extract these amplitudes from the EMS. This also leads us to the required posterior on $\varepsilon$. Next, using the knowledge of the amplitude, we extract the corresponding interarrival. We realize that knowledge that this parameter is not the actual radionuclide source value, since it has been transported to the detector. However, for the same monoenergetic photon these values will be identical enabling us to "time-tag" the correct photon while allowing us to reject those that have been "down-scattered" from higher energies. So we see based on these conditions and motivated by the physics as well as the structure of the joint posterior we: (1) first detect the energy amplitudes and estimate (extract) their values from the EMS; and (2) then detect/extract the corresponding interarrival times.

Figure 5:
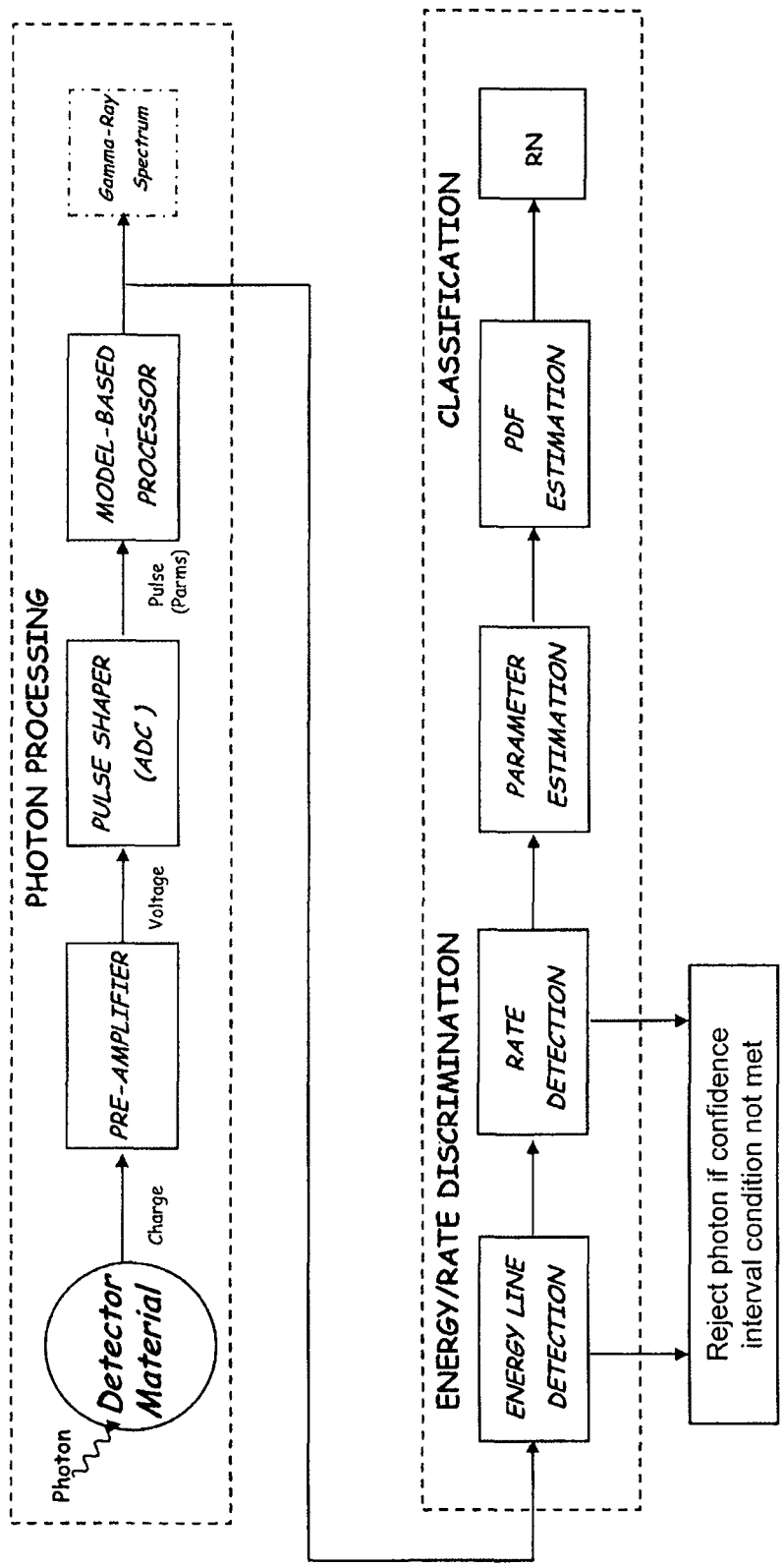
FIG. 5 shows the Bayesian radiation detection channel details, acquisition, preprocessing (MBP), energy/rate discrimination and classification.

FIG. 5 shows an exemplary embodiment of a single photon channel processor of the present invention for line/rate detection after the acquisition and pre-processing steps are performed along with a pulse-height spectrum (PHS) estimate (not required). Simple energy amplitude level and rate detectors are first performed to determine the status (accept or reject) of the processed photon—these discriminators implement the indicator function discussed previously. If acceptable, it is used to estimate the required posterior distribution for radionuclide detection.

Summarizing, we started with the objective of capturing the joint posterior probability distribution of a radionuclide for detection and then perform the required decompositions to characterize a potential sequential processor design. Again the design is completely driven by the idea of extracting the monoenergetic EMS from the measured data. We can accomplish this, sequentially, by individual photon processing on arrival. Therefore, we first uniquely defined an individual radionuclide by its set of monoenergetic parameters along with its corresponding probability distribution from its associated energy level diagram. We note that each energy amplitude level, interarrival time and associated rate parameter are independent of any of the other monoenergetic lines composing the radionuclide implying that the processor should first detect the energy amplitudes associated with the radionuclide mixture and then once detected should detect the interarrival time (rate parameter) or time-tag for that particular monoenergetic source from its corresponding interarrival times. These concepts then lead to a parallel/distributed structure illustrated in the diagram of FIG. 6.

After the photon is processed by a model-based physics processor using a sequential Bayesian technique the distributed detector: (1) discriminates the individual monoenergetic amplitudes identifying one of the parallel channels; (2) discriminates the corresponding rate parameter for that particular channel is then detected using the corresponding interarrival times available and confirming the monoenergetic source detection from two parameters rather than one amplitude parameter; (3) the particular amplitude and rate parameters are then estimated along with the corresponding distributions enabling the estimation of the radionuclide posterior; and (4) detection is performed.

Figure 6:
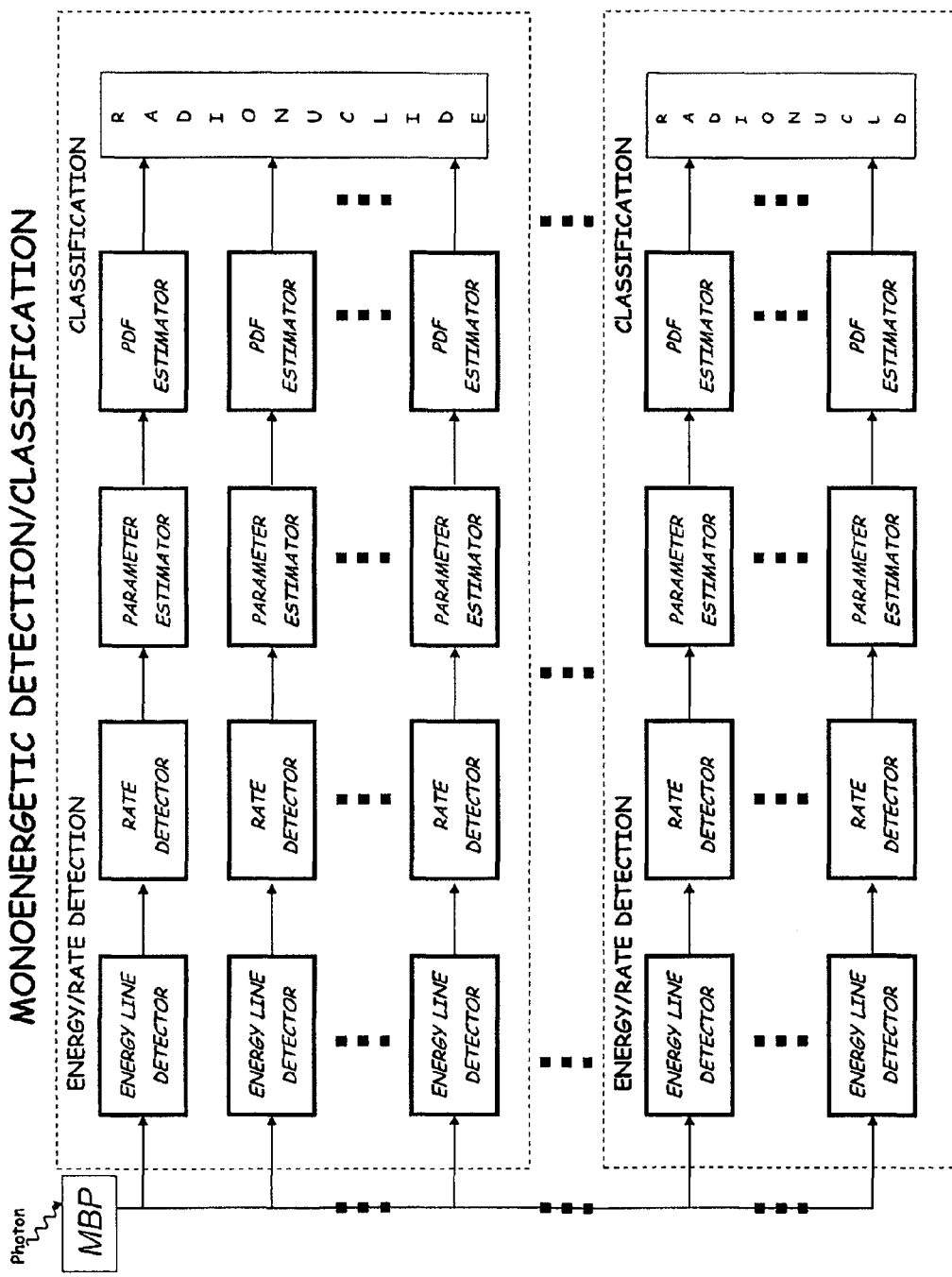
FIG. 6 shows the Bayesian radiation detection parallel/distributed processing.

The entire parallel/distributed processor structure is shown in FIG. 6. There are some interesting features and by-products of this design:
  Incorporates an inherent distributed structure that evolves from the physics (monoenergetic decomposition);
  Each photon is sequentially processed one-by-one on deposition in the detector material;
  Only one energy amplitude level and rate parameter are detected per photon (single channel);
  If no detection for a given photon is achieved, the photon is discarded (not used) mitigating false positive detections of radionuclides;
  Bayesian classification is accomplished using the estimated joint probability distributions (after the channel detection is confirmed);
  Other physics properties can be incorporated, if another distributed (parallel) bank of rate detectors are employed providing a means of detecting corresponding Compton photons and incorporating them into the estimated monoenergetic probability distributions, that is, they can be counted, since they are really a scattered monoenergetic photon;
  Scattered photons from higher energy gamma-rays can be eliminated from the distribution using rate parameter discrimination;

Background photons are automatically rejected, since they are not identified with and monoenergetic channel; and Parallel implementation of the processor (invention) is easily implemented enabling a potential real-time application due to the distributed structure.

To summarize, we are essentially implementing the monoenergetic decomposition using discriminators to "decide" which threat energy amplitude level/rate channel the photon belongs to or rejecting it completely if no such channel indicates a valid detection. In this way we are able to simplify such tools as the pulse-height spectrum for energy-line amplitude discrimination and improve overall threat detection performance. This completes the conceptual design of the Bayesian processor for radionuclide detection, next we develop the various components of the processor for implementation.

C. SEQUENTIAL BAYESIAN RADIATION DETECTION

In this section, we develop the Bayesian framework and individual components of the processor. Thus, we see that the overall system diagram of the process follows through the various operations of the component subsystems dictated by the physics and instrumentation. Mathematically, we see that the original γ-ray transport has evolved from the simple monoenergetic representation of Eq. 3 in terms of precise weighted impulses and interarrivals to be distorted and smeared by the detector physics and processing. We see that the intrinsic scattering and attenuation in the detector material can reduce the number of electrons that are thresholded by the detector electronics for counting. The energy level is distorted by the detector response and the timing by jitter and delay-time. This uncertain EMS propagates to the shaping electronics in which uncertainties of the impulse events are smeared and spread by the Gaussian filtering process.

For our radiation detection problem we are utilizing two-levels of energy and interarrival time (rate) detection. The first level consists of an acceptance/rejection of the photon for further processing based on simple hypotheses tests of its energy amplitude level followed by interarrival time testing. Since we are interested in the radionuclide detection problem, we have a-priori information available about the targeted radionuclide(s) such as expected energy line amplitude, probability of occurrence of that line and rates. We can use this information to implement a "discrimination" or pre-conditioning step that essentially "filters" each photon as it is collected and compares its amplitude to the a-priori line amplitude expected (theoretically). It is then processed further to make a more definitive decision. With the energy amplitude processed in the appropriate channel (see FIG. 5), the rate or equivalently interarrival time is processed to "decide" if this parameter corresponds to the targeted radionuclide, that is, we "time-tag" each photon with its measured interarrival time. If it is accepted, then both the raw energy amplitude and interarrival time are processed to improve the quality of their point estimates and specify the underlying probability distribution. This estimator incorporate the a-priori information about the initial parameters, noise and any other statistics available to extract an improved estimate, say $\{\epsilon(n), \Delta\tau(n)\} \rightarrow \{\hat{\epsilon}(n), \Delta\hat{\tau}(n)\}$ at the $n^{th}$-arrival. The estimates are then provided as inputs to a sequential Bayesian detection technique to further assure that the photon emanated from the targeted source. Upon acceptance, the improved estimates $\{\hat{\epsilon}(n), \Delta\hat{\tau}(n)\}$ are used to estimate the required conditional distributions used for classification. We first start with the basic sequential detection problem and then incorporate the required probability distributions for this problem.

To formally pose this problem, we appeal to classical (sequential) detection theory. We are to test the binary hypothesis that the measured EMS sequence has evolved from the targeted radionuclide (RN) characterized uniquely from the monoenergetic decomposition of Eq. 7. Therefore, we specify the hypothesis test $$H_0: \xi(n;\underline{\epsilon},\Delta\underline{\tau}) = R_\eta(n;\underline{\epsilon}^0,\Delta\underline{\tau}^0) + v(n) \text{ [TARGET RN]}$$

$$H_1: \xi(n;\underline{\epsilon},\Delta\underline{\tau}) = R_\eta(n;\underline{\epsilon},\Delta\underline{\tau}) + v(n) \text{ [NON-TARGET RN]} \quad (16)$$

where $R_\eta(n; \epsilon, \Delta\tau)$ is a random composite EMS contaminated with zero-mean, Gaussian measurement (instrumentation) noise, $v \sim N(0, \sigma_v^2)$ corresponding to the monoenergetic decomposition we have the "random" parametric model $$R_\eta(n; \underline{\epsilon}, \Delta\underline{\tau}) = \sum_{m=1}^{M_\epsilon} \sum_{n=1}^{N_\epsilon(m)} I_j(m) \epsilon_m(n) \delta(t - \Delta\tau_m(n)) \quad (17)$$

for $\epsilon_m \sim N(\bar{\epsilon}_m, \sigma_{\epsilon_m}^2)$ and $\Delta\tau_m \sim E(\lambda_{\Delta\tau_m} \Delta\tau_m(n))$.

The optimal solution to this binary decision problem is based on applying the Neyman-Pearson theorem leading to the likelihood ratio [25] and is given by the ratio of probabilities $$L[\Xi_N] := \frac{x Pr(\Xi_N | H_1)}{Pr(\Xi_N | H_0)} \begin{array}{c} H_1 \\ > \\ < \\ H_0 \end{array} T \quad (18)$$

where $\Xi_N := \{\xi(0;\underline{\epsilon},\Delta\underline{\tau}), \xi(1;\underline{\epsilon},\Delta\underline{\tau}), \ldots, \xi(N; \underline{\epsilon}, \Delta\underline{\tau})\}$ and $$N = \sum_{m=1}^{M_\epsilon} N_\epsilon(m).$$

Expanding the likelihood ratio, we obtain $$L[\Xi_N] = \frac{Pr(\xi(0; \underline{\epsilon}, \Delta\underline{\tau}), \xi(1; \underline{\epsilon}, \Delta\underline{\tau}), \ldots, \xi(N; \underline{\epsilon}, \Delta\underline{\tau}) | H_1)}{Pr(\xi(0; \underline{\epsilon}, \underline{\tau}), \xi(1; \underline{\epsilon}, \Delta\underline{\tau}), \ldots, \xi(N; \underline{\epsilon}, \Delta\underline{\tau}) | H_0)} \quad (19)$$

but from the chain rule of probability, we have that $$Pr(\Xi_N | H_i) = Pr(\xi(N;\underline{\epsilon},\Delta\underline{\tau}) | \Xi_{N-1}, H_i) \times \ldots \times Pr(\xi(1;\underline{\epsilon},\Delta\underline{\tau}) | \xi(0;\underline{\epsilon};\Delta u), H_i) \times Pr(\xi(0;\underline{\epsilon},\Delta\underline{\tau}) | H_i) \quad (20)$$

which can be expressed succinctly using Bayes' rule as $$Pr(\Xi_N | H_i) = Pr(\xi(N;\underline{\epsilon},\Delta\underline{\tau}), \Xi_{N-1} | H_i) = Pr(\xi(N;\underline{\epsilon},\Delta\underline{\tau}) | \Xi_{N-1}, H_i) \times Pr(\Xi_{N-1} | H_i) \quad (21)$$

Substituting these expressions into the likelihood ratio of Eq. 18, replacing $N \rightarrow n$ and grouping we obtain $$L[\Xi_n] = \left[\frac{Pr(\Xi_{n-1} | H_1)}{Pr(\Xi_{n-1} | H_0)}\right] \times \frac{Pr(\xi(n; \underline{\epsilon}, \Delta\underline{\tau}) | \Xi_{n-1}, H_1)}{Pr(\xi(n; \underline{\epsilon}, \Delta\underline{\tau}) | \Xi_{n-1}, H_0)} \quad (22)$$

and therefore, we have the recursion or equivalently sequential likelihood ratio for the $n^{th}$ arrival as $$L[\Xi_n] = L[\Xi_{n-1}] \times \frac{Pr(\xi(n; \underline{\varepsilon}, \Box\underline{\tau}) | \Xi_{n-1}, H_1)}{Pr(\xi(n; \underline{\varepsilon}, \Box\underline{\tau}) | \Xi_{n-1}, H_0)} \quad (23)$$

The corresponding Wald or sequential probability ratio test is then given by:

$$L[\Xi_n] \geq T_1(n) \quad \text{Accept } H_1 \quad (24)$$
$$T_0(n) \leq L[\Xi_n] \leq T_1(n) \quad \text{Continue}$$
$$L[\Xi_n] \leq T_0(n) \quad \text{Accept } H_0$$

where the thresholds are specified in terms of the false alarm ($P_{FA}$) and miss ($P_M$) probabilities as $$T_0(n) = \frac{P_M(n)}{P_{FA}(n)}$$
$$T_1(n) = \frac{1 - P_M(n)}{P_{FA}(n)}$$

If the distributions under investigation are members of the exponential family then taking logarithms can simply the computations We define $\Lambda[\Xi_n] := \ln L[\Xi_n]$ to obtain the sequential log-likelihood $$\Lambda[\Xi_n] = \Lambda[\Xi_{n-1}] + \ln Pr(\xi(n; \underline{\varepsilon}, \Delta\underline{\tau}) | \Xi_{n-1}, H_1) - \ln Pr(\xi(n; \underline{\varepsilon}, \Delta\underline{\tau}) | \Xi_{n-1}, H_0) \quad (25)$$

and therefore, the corresponding test becomes $$\Lambda[\Xi_n] \geq \ln T_1(n) \quad \text{Accept } H_1 \quad (26)$$
$$\ln T_0(n) \leq \Lambda[\Xi_n] \leq \ln T_1(n) \quad \text{Continue}$$
$$\Lambda[\Xi_n] \leq \ln T_0(n) \quad \text{Accept } H_0$$

So we see that at each photon arrival (at time n), we sequentially update the likelihood and thresholds to perform the detection—"photon-by-photon".

To implement the sequential detector, we must specify the required distributions; therefore, we have $$Pr(\xi(n; \varepsilon, \Box\tau) | \Xi_{n-1}, H_l) = Pr(R_\eta(n; \varepsilon, \Box\underline{\tau}, I_j(m) | \Xi_{n-1}, H_l) + Pr(v(n) | \Xi_{n-1}, H_l) \quad (27)$$

for the hypotheses is specified by $H_l$; l=0, 1.
Using the radionuclide model, we obtain $$Pr(\xi(n; \varepsilon, \Box\tau) | \Xi_{n-1}, H_l) = Pr(\underline{\varepsilon}(n), \Box\underline{\tau}(n), I_j(m) | \Xi_{n-1}, H_l) + Pr(\overline{v}(n) | \Xi_{n-1}, H_l) \quad (28)$$

Applying Bayes' rule, we obtain the decomposition (as before)

$$Pr(\xi(n; \varepsilon, \Box\tau) | \Xi_{n-1}, H_l) = Pr(\Box\underline{\tau}(n), I_j(m), \Xi_{n-1}, H_l) \times Pr(\underline{\varepsilon}(n) | I_j(m), \Xi_{n-1}, H_l) \times Pr(I_j(m) | \Xi_{n-1}, H_l) + Pr(\overline{v}(n) | \Xi_{n-1}, H_l) \quad (29)$$

Decomposing the parameter vectors using the fact that each arrival has "no memory" and applying the chain rule of probability, we obtain $$Pr(\Box\underline{\tau}(n) | \underline{\varepsilon}(n), I_j(m), \Xi_{n-1}, H_l) = \quad (30)$$
$$\prod_{m=1}^{M_\varepsilon} Pr(\Box\tau_m(n) | \varepsilon_m(n), I_j(m), \Xi_{n-1}, H_l)$$

-continued
$$Pr(\underline{\varepsilon}(n), I_j(m) | \Xi_{n-1}, H_l) =$$
$$\prod_{m=1}^{M_\varepsilon} Pr(\varepsilon_m(n) | I_j(m), \Xi_{n-1}, H_l) \times Pr(I_j(m) | \Xi_{n-1})$$

and therefore, we have $$Pr(\xi(n; \underline{\varepsilon}, \Box\underline{\tau}) | \Xi_{n-1}, H_l) = \quad (31)$$
$$\prod_{m=1}^{M_\varepsilon} Pr(\Box\tau_m(n) | \varepsilon_m(n), I_j(m), \Xi_{n-1}, H_l) \times Pr(\varepsilon_m(n) | I_j(m),$$
$$\Xi_{n-1}, H_l) \times Pr(I_j(m) | \Xi_{n-1}, H_l) + Pr(v(n) | \Xi_{n-1}, H_l)$$

Substituting these distributions into Eq. 23 the sequential likelihood ratio detector is $$L[\Xi_n] = L[\Xi_{n-1}] \times \frac{\prod_{m=1}^{M_\varepsilon} Pr(\Box\tau_m(n) | \varepsilon_m(n), I_j(m), \Xi_{n-1}, H_1) \times Pr(\varepsilon_m(n), I_j(m) | \Xi_{n-1}, H_1) + Pr(v(n) | \Xi_{n-1}, H_1)}{\prod_{m=1}^{M_{\varepsilon}tion} Pr(\Box\tau_m^o(n) | \varepsilon_m^o(n), I_j^o(m), \Xi_{n-1}, H_0) \times Pr(\varepsilon_m^o(n), I_j^o(m) | \Xi_{n-1}, H_0) + Pr(v(n) | \Xi_{n-1}, H_0)} \quad (32)$$

where $$Pr(\epsilon_m(n), I_j(m) | \Xi_{n-1}, H_l) = Pr(\epsilon_m(n) | I_j(m), \Xi_{n-1}, H_l) \times Pr(I_j(m) | \Xi_{n-1}, H_l)$$

giving us the general form for our problem. Note that this formulation provides us with a channel-by-channel (photon-by-photon) processor, since the $m^{th}$ terms in both numerator and denominator are available at the output of each channel (FIG. 6)

Let us also assume that the instrumentation noise (v(n)) is small relative to the uncertainties and ignore it in the likelihood relation, then the likelihood ratio simplifies to $$L[\Xi_n] = L[\Xi_{n-1}] \times \frac{\prod_{m=1}^{M_\varepsilon} Pr(\Box\tau_m(n) | \varepsilon_m(n), I_j(m), \Xi_{n-1}, H_1) \times Pr(\varepsilon_m(n), I_j(m) | \Xi_{n-1}, H_1)}{\prod_{m=1}^{M_\varepsilon} Pr(\Box\tau_m^o(n) | \varepsilon_m^o(n), I_j^o(m), \Xi_{n-1}, H_0) \times Pr(\varepsilon_m^o(n), I_j^o(m) | \Xi_{n-1}, H_0)} \quad (33)$$

Taking logarithms, we obtain the log-likelihood ratio of Eq. 25 as $$\Lambda[\Xi_n] = \quad (34)$$
$$\Lambda[\Xi_{n-1}] + \sum_{m=1}^{M_\varepsilon} \ln(Pr(\Box\tau_m(n) | \varepsilon_m(n), I_j(m), \Xi_{n-1}, H_1) Pr(\varepsilon_m(n),$$
$$I_j(m) | \Xi_{n-1}, H_1)) -$$
$$\sum_{m=1}^{M_\varepsilon} \ln(Pr(\Box\tau_m^o(n) | \varepsilon_m^o(n), I_j^o(m), \Xi_{n-1}, H_0) Pr(\varepsilon_m^o(n),$$

-continued
$$I_j^o(m) \mid \Xi_{n-1}, H_0))$$

but the terms inside the summation are products which can also be written as summations, after applying Bayes' rule to the last term $$\ln Pr(\Delta\tau_m(n)\mid\epsilon_m(n),I_j(m),\Xi_{n-1},H_l)\times Pr(\epsilon_m(n),$$
$$I_j(m)\mid\Xi_{n-1},H_l)=\ln Pr(\Delta\tau_m(n)\mid\epsilon_m(n),I_j(m),\Xi_{n-1},$$
$$H_l)+\ln Pr(\epsilon_m(n)\mid I_j(m),\Xi_{n-1},H_l)+\ln Pr(I_j(m)\mid\Xi_{n-1},H_l) \quad (35)$$

These relations will become important in the implementation of the processor discussed subsequently.

C.1 Sequential Radiation Detection

In this section we develop the statistical models to implement the likelihood-ratio detector of Eq. 32. We start with the additive noise source, $v(n)$, assumed Gaussian under both hypothesis, that is, $$Pr(v(n)\mid\Xi_{n-1}, H_l)\sim N(0,\sigma_v^2) = \frac{1}{\sqrt{2\pi}\,\sigma_v}\exp\left\{-\frac{v^2(n)}{2\sigma_v^2}\right\} \quad (36)$$

Since each individual RN is uniquely specified (statistically) by the parameter set, $\{\epsilon,\Delta\tau,\alpha\}$, we assume that $\alpha$ is known for each target (from tables). Therefore, the energy amplitude level distribution and its decomposition of Eq. 30

$$Pr(\varepsilon(n), I_j(m)\mid \Xi_{n-1}, H_l) = \quad (37)$$
$$\prod_{m=1}^{M_\varepsilon} Pr(\varepsilon_m(n)\mid I_j(m), \Xi_{n-1}, H_l)\times Pr(I_j(m)\mid\Xi_{n-1}, H_l)$$

Thus, for the $j^{th}$-monoenergetic source component selected by the indicator function, $I_j(m)$, we obtain $$Pr(\epsilon_j(n),I_j(m)\mid\Xi_{n-1},H_l)=\alpha_j\alpha_j Pr(\epsilon_j(n)\mid\Xi_{n-1},H_l) \quad (38)$$

where we have applied $Pr(I_j(m)=1\mid\Xi_{n-1})=\alpha_j$.

Each energy amplitude component is assumed Gaussian with corresponding distribution $$Pr(\varepsilon_m(n)\mid I_j(m),\Xi_{n-1},H_l)\sim N(\bar{\varepsilon}_j(n),\sigma_{\varepsilon_j}^2) = \quad (39)$$
$$\frac{1}{\sqrt{2\pi}\,\sigma_{\varepsilon_j}}\exp\left\{-\frac{(\varepsilon_j(n)-\bar{\varepsilon}_j(n))^2}{2\sigma_{\varepsilon_j}^2}\right\}$$

Finally, the interarrival times, $\Delta\tau$, are assumed conditionally independent of both $\underline{\epsilon}$ and $I_j(m)$ to give $$Pr(\Delta\tau(n)\mid\underline{\epsilon}(n), I_j(m), \Xi_{n-1}, H_l) = \quad (40)$$
$$Pr(\Delta\tau(n)\mid\Xi_{n-1}, H_l) = \prod_{m=1}^{M_\varepsilon} Pr(\Delta\tau_m(n)\mid\Xi_{n-1}, H_l)$$

Each interarrival is independent and exponentially distributed such that $$Pr(\Delta\tau(n)\mid\Xi_{n-1}, H_l) = \quad (41)$$

$$\prod_{m=1}^{M_\varepsilon} Pr(\Delta\tau_m(n)\mid\Xi_{n-1}, H_l) = \prod_{m=1}^{M_\varepsilon}\lambda_{\Delta\tau_m}\exp\{-\lambda_{\Delta\tau_m}\Delta\tau_m(n)\}$$

for the rate $\lambda_{\Delta\tau_m}=1/\overline{\Delta\tau_m}$ or equivalently, the reciprocal of the mean interarrival time.

For the $j^{th}$-monoenergetic source component, we have $$Pr(\Delta\tau(n)\mid I_j(m),\Xi_{n-1},H_l)\sim E(\lambda\Delta_{\tau_j}\Delta\tau_j(n))=\lambda$$
$$\Delta_{\tau_j}\exp\{-\lambda\Delta_{\tau_j}\Delta\tau_j(n)\} \quad (42)$$

With these distribution models in hand, we can now construct the sequential detection algorithm starting with the required distributions as $$Pr(\xi(n;\underline{\varepsilon},\Delta\underline{\tau})\mid\Xi_{n-1}, H_l) = \quad (43)$$
$$\prod_{k=1}^{M_\varepsilon} Pr(\Delta\tau_k(n)\mid\Xi_{n-1}, H_l)\times Pr(\varepsilon_k(n)\mid I_j(m), \Xi_{n-1}, H_l) umber \times$$
$$Pr(I_j(m)\mid\Xi_{n-1}) + Pr(v(n)\mid\Xi_{n-1}, H_l)$$

or $$Pr(\xi(n;\underline{\varepsilon},\Delta\underline{\tau})\mid\Xi_{n-1}, H_l) = \prod_{m=1}^{M_\varepsilon}\lambda_{\Delta\tau_k}\exp\{-\lambda_{\Delta\tau_n}\Delta\tau_n(n)\}\times$$
$$\frac{\alpha_m}{\sqrt{2\pi}\,\sigma_{\varepsilon_m}}\exp\left\{-\frac{(\varepsilon_m(n)-\bar{\varepsilon}_m(n))^2}{2\sigma_{\varepsilon_m}^2}\right\} + \frac{1}{\sqrt{2\pi}\,\sigma_v}\exp\left\{-\frac{v^2(n)}{2\sigma_v^2}\right\}$$

which leads to the sequential likelihood ratio detection processor as $$L[\Xi_n] = \quad (44)$$

$$L[\Xi_{n-1}]\times\frac{\displaystyle\prod_{m=1}^{M_\varepsilon}\frac{\alpha_m\lambda_{\Delta\tau_m}}{\sqrt{2\pi}\,\sigma_{\varepsilon_m}}\exp\left\{\frac{-\lambda_{\Delta\tau_m}\Delta\tau_m(n)-(\varepsilon_m(n)-\bar{\varepsilon}_m(n))^2}{2\sigma_{\varepsilon_m}^2}\right\}+\frac{1}{\sqrt{2i}\,\sigma_v}\exp\left\{-\frac{v^2(n)}{2\sigma_v^2}\right\}}{\displaystyle\prod_{m=1}^{M_\varepsilon}\frac{\alpha_m^o\lambda_{\Delta\tau_m}^o}{\sqrt{2\pi}\,\sigma_{\varepsilon_m}}\exp\left\{\frac{-\lambda_{\Delta\tau_m}^o\Delta\tau_m(n)-(\varepsilon_m(n)-\varepsilon_m^o(n))^2}{2\sigma_{\varepsilon_m}^2}\right\}+\frac{1}{\sqrt{2\pi}\,\sigma_v}\exp\left\{-\frac{v^2(n)}{2\sigma_v^2}\right\}}$$

for the rate $$\lambda_{\Delta\tau_m}^o = \frac{1}{\overline{\Delta\tau_m^o}}.$$

As before, assuming that the instrumentation noise ($v(n)$) is small relative to the uncertainties, the likelihood ratio simplifies to $$L[\Xi_n] = \quad (45)$$

-continued $$L[\Xi_{n-1}] \times \frac{\prod_{m=1}^{M_\varepsilon} \frac{\alpha_m \lambda_{\Box\tau_m}}{\sqrt{2\pi}\,\sigma_{\varepsilon_m}} \exp\left\{\frac{-\lambda_{\Box\tau_m}\Box\tau_m(n)-(\varepsilon_m(n)-\bar{\varepsilon}_m(n))^2}{2\sigma_{\varepsilon_m}^2}\right\}}{\prod_{m=1}^{M_\varepsilon} \frac{\alpha_m^o \lambda_{\Box\tau_m}^o}{\sqrt{2\pi}\,\sigma_{\varepsilon_m^o}} \exp\left\{\frac{-\lambda_{\Box\tau_m}^o \Box\tau_m(n)-(\varepsilon_m(n)-\varepsilon_m^o(n))^2}{2\sigma_{\varepsilon_m^o}^2}\right\}}$$

Taking logarithms, we obtain the log-likelihood ratio of Eq. 34 as $$\Lambda[\Xi_n] = \Lambda[\Xi_{n-1}] + \sum_{m=1}^{M_\varepsilon}\ln\left(\frac{\alpha_m\lambda_{\Box\tau_m}}{\sqrt{2\pi}\,\sigma_{\varepsilon_m}}\right) - \ln\left(\frac{\alpha_m^o\lambda_{\Box\tau_m}^o}{\sqrt{2\pi}\,\sigma_{\varepsilon_m^o}}\right) + \quad (46)$$

$$(\lambda_{\Box\tau_m}^o - \lambda_{\Box\tau_m})\Box\tau_m(n) + \frac{1}{2}\left(\frac{\varepsilon_m(n)-\varepsilon_m^o(n)}{\sigma_{\varepsilon_m^o}}\right)^2 - \frac{1}{2}\left(\frac{\varepsilon_m(n)-\bar{\varepsilon}_m(n)}{\sigma_{\varepsilon_m}}\right)^2$$

This completes the structure of the sequential Bayesian radiation detector, we will discuss the actual photon-by-photon implementation of this processor in a subsequent section.

C.2 Sequential Bayesian Parameter Estimation

In order to implement this radionuclide detection scheme described in section C.1, we must estimate the underlying parameter (amplitude and interarrival time) distributions, but before we can accomplish this we have to specify the required signal and noise models. Investigating the monoenergetic EMS decomposition of a radionuclide $R_\eta$ with $M_\varepsilon$ monoenergetic source components and $N_\varepsilon(m)$ counts in the total interval of count length N, we can define an overall parameter vector by $$\Theta := [\epsilon|\tau] = [\epsilon_1\epsilon_2\ldots\epsilon_{M_\varepsilon}|\Box\tau_1\Box\tau_2\ldots\Box\tau_{M_\varepsilon}] \text{ for}$$
$$\Theta \in R^{2M_\varepsilon\times 1}$$

requiring $2M_\varepsilon$ parameters to specify the unknown radionuclide. The number of arrivals counted in the interval N is $N_\varepsilon := [N_\varepsilon(1)\ldots N_\varepsilon(M_\varepsilon)]$ such that $$N = \sum_{m=1}^{M_\varepsilon} N_\varepsilon(m),$$

as before.

We assume that the energy amplitudes can be characterized by a random walk model $$\epsilon(n)=\epsilon(n-1)+w_\epsilon(n-1) \quad (47)$$

for $\epsilon$, $w \in R^{2M_{x\epsilon}\times 1}$ and $\epsilon\Box N(\bar{\epsilon}, R_{\bar{\epsilon}\bar{\epsilon}})\Box N(0, R_{w_\epsilon w_\epsilon})$. The measurement instrument measures both photon energy amplitude and interarrival time from the EMS, therefore, it provides the vector measurement $$\xi(n):=[\xi_\epsilon(n)|\xi\Box_\tau(n)] \quad (48)$$

We model the energy amplitude component as the level contaminated with zero-mean, Gaussian instrumentation noise such that $$\xi_\epsilon(n)=c'\epsilon(n)+v_\epsilon(n)=\epsilon_m(n)+v_\epsilon(n) \quad (49)$$

since the scalar measurement is photon-by-photon with $v_\epsilon \Box N(0, R_{v_\epsilon v_\epsilon})$. The measurement system vector c' is a $1\times M_\varepsilon$, unit row vector, that is, $c'=e'_m$ with a one in the $m^{th}$ column. Thus, our final photon energy amplitude level model is given by a Gauss-Markov representation $$\epsilon(n)=\epsilon(n-1)+w_\epsilon(n-1)$$

$$\xi_\epsilon(n)=c'\epsilon(n)+v_\epsilon(n) \quad (50)$$

with noise sources $w_\epsilon$ and $v_\epsilon$ characterized by zero-mean, multivariate Gaussian distribution with covariance matrices, $R_{w_\epsilon w_\epsilon}$ and $R_{v_\epsilon v_\epsilon}$, respectively and the initial states the true mean values characterizing the target RN, $\epsilon(0)\Box N(\bar{\epsilon}_o, R_{\bar{\epsilon}_o\bar{\epsilon}_o})$.

Since we first discriminate the energy amplitude level to determine which channel to process it, the actual implementation requires only a scalar algorithm for the $m^{th}$-monoenergetic line, that is, the monoenergetic line estimator is based on the Markovian representation as $$\epsilon_m(n)=\epsilon_m(n-1)+w_{\epsilon_m}(n-1) \text{ for } w_{\epsilon_m}\Box N(0, R_{w_{\epsilon_m}w_{\epsilon_m}})$$

$$\xi_\epsilon(n)=\epsilon_m(n)+v_\epsilon(n) \text{ for } v_\epsilon\Box N(0, R_{v_\epsilon v_\epsilon}) \quad (51)$$

with $\epsilon_m(0)\Box N(\bar{\epsilon}_m, R_{\bar{\epsilon}_m\bar{\epsilon}_m})$. Thus, photon-by-photon processing leads to a scalar channel-y-channel implementation.

Since these characterizations are linear Gauss-Markov models, we know that the optimal Bayesian processor is the linear Kalman filter with posterior distribution given by $$Pr(\epsilon_m(n)|\Xi_n) \sim N(\hat{\epsilon}_m*n|n), \tilde{P}_{\epsilon_m\epsilon_m}(n|n))$$

with conditional mean and variance specified by $$\hat{\epsilon}_m(n|n)=\hat{\epsilon}_m(n|n-1)+K_{\epsilon_m}(n)e_m(n)$$

$$e_m(n)=\xi_\epsilon(n)-\hat{\epsilon}_m(n|n-1)$$

$$K_{\epsilon_m}(n)=\tilde{P}_{\epsilon_m\epsilon_m}(n|n))/R_{e_m e_m} \quad (52)$$

where $\hat{\epsilon}_m(n|n)$ is the conditional mean estimate of the $m^{th}$-energy amplitude level at arrival time n based on all of the data up to n. Next we consider the interarrival processor.

From the statistics of the EMS process, we know that the interarrival times are exponentially distributed with parameter $\lambda\Box_\tau$ such that $\Box\tau(n)\Box E(\lambda\Box_\tau\Box\tau(n))$ where $E(\lambda\Box_\tau\Box\tau(n))=\lambda\Box_\tau\exp(-\lambda\Box_\tau\times\Box\tau(n))$. Our process model for the interarrival time is just an exponential random variable, while the underlying measurement model is this variable contaminated with exponential measurement (instrumentation) noise given by $$\Box\tau_m(n)=w\Box_{\tau_m}(n) \text{ for } w\Box_{\tau_m}\Box E(\lambda\Box_{\tau_m}\Box\tau_m(n))$$

$$\xi\Box_\tau(n)=\Box\tau_m(n)+v\Box_{\tau_m}(n) \text{ for } v\Box_{\tau_m}\Box E(\lambda\Box_{\tau_m}v\Box_{\tau_m}(n)) \quad (53)$$

The corresponding likelihood for this problem is easily obtain using the measurement model and the transformation of random variable rules to give $$Pr(\xi_{\Delta\tau}(n)|\Delta\tau(n))=\lambda_v e^{-v(\xi_{\Delta\tau}(n)-\Delta\tau(n))} \quad (54)$$

We estimate the posterior distribution using a sequential Monte Carlo approach and construct a bootstrap particle filter (see appendix for details) using the following steps:

Initialize: $\Box\tau_m(0)\Box E(\Box\bar{\tau}_m(0))$, $w\Box_{\tau_m}\Box E(\Box\bar{\tau}_m(0))$, $W_i(0)=1/N_p$; $i=1,\ldots,N_p$;

State Transition: $\Box\tau_{m_i}(n)=w\Box_{\tau_{m_i}}(n)$ for $w_{m_i}\Box Pr(w_{m_i}(n))$;

Log-Likelihood: $\ln C(\xi\Box_{\tau_m}(n)\Box\tau_{m_i}(n))=\ln \lambda_v-\lambda_v\times(\xi\Box_\tau(n)-\Box\tau(n))$;

Weights: $W_i(n)=W_i(n-1)\times C(\xi\Box_{\tau_m}(n)\Box\tau_{m_i}(n))$;

Normalize:

$$W_i(n) = \frac{W_i(n)}{\sum_{i=1}^{N_p} W_i(n)};$$

Resample: $\hat{\tau}_{m_i}(n) \Rightarrow \tau_{m_i}(n)$;

Posterior: $Pr(\tau_m(n) | \Xi_n) = \sum_{i=1}^{N_p} W_i(n)\delta(\xi_{\tau_m}(n) - \xi_{\tau_{m_i}}(n))$; (5)

and

MAP Estimate: $\hat{\tau}_{map}(n) = \arg\max Pr(\tau_m(n)|\Xi_n)$.

So we see that the sequential likelihood radionuclide detector evolves from estimating the required posterior distributions which require parameter estimates of both energy line amplitude and rate (interarrival times) for implementation. We used a Rao-Blackwellization approach by partitioning the state vector into the amplitude and interarrival estimators and applying a linear Kalman filter for the Gaussian distributed amplitude and a particle filter (see Appendix B) for the exponentially distributed interarrival times (rate)—channel-by-channel. Next we investigate the design and implementation of the actual processor.

C.3 Sequential Bayesian Processor Implementation

Figure 4:
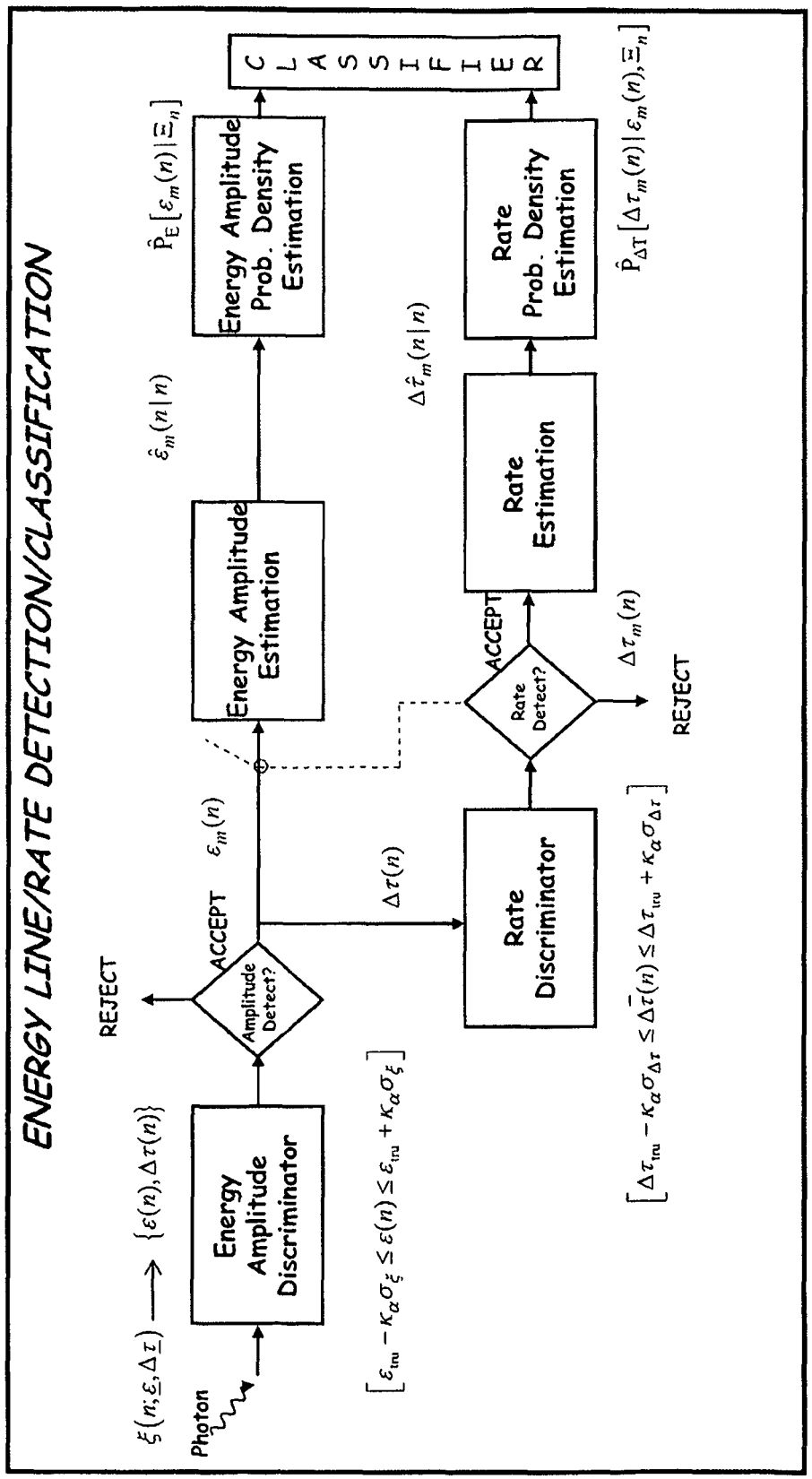
FIG. 4 shows the Bayesian channel processing for radionuclide detection/classification including: energy/interarrival (rate) discrimination, parameter estimation (LKF and PF), probability density function (PDF) estimation and classification.

In this section we discuss the implementation of the processor for the radionuclide detection processor following the design structure developed in Sec. B. First, we investigate the individual channel processor illustrated in FIG. 4 one for each energy amplitude/rate composing the target radionuclide.

C.3.1 Energy Amplitude Level/Interarrival (Rate) Discriminator

Based on the parallel/distributed architecture of the detector/classifier illustrated in FIG. 6, we first apply an energy amplitude discriminator to "decide" on which channel the photon should be processed and then follow it with a rate discriminator using the interarrival time "tag" to eliminate downscattered photons from higher energy photons. The discriminator used implied hypothesis testing by constructing a confidence interval about the means of the respective parameters. The energy amplitude level discriminator performs the following confidence interval test to accept or reject the photon:

$$[\epsilon_{tru} - \kappa_\alpha \sigma_\xi \leq \epsilon_m(n) \leq \epsilon_{tru} - \kappa_\alpha \sigma_\xi]$$ (55)

where $\epsilon_{tru}$ is the true (channel) energy amplitude associated with the targeted (for detection) radionuclide, $\xi_\epsilon(n)$ is the raw EMS photon arrival amplitude level measurement, $\kappa_\alpha$ is the respective confidence coefficient with associated confidence level $\alpha$ and $\sigma_\xi$ is the associated standard deviation associated with the precision of the measurement instrument. When the photon amplitude is accepted as belonging to the $m^{th}$-channel, then $\xi_{ilon_m} \to \epsilon_m(n)$ and the interarrival measurement time-tag is tested similarly for validity by the following confidence interval discriminator. (Note that for large n, the estimate is approximately Gaussian, $\hat{\tau} \sim N(\lambda, \lambda/\sqrt{n})$)

$$[\tau_{tru} - \kappa_{\overline{\alpha}}\sigma_{\tau} \leq \hat{\tau}_m(n) \leq \tau_{tru} - \kappa_{\overline{\alpha}}\sigma_{\tau}]$$ (56)

where $\tau_{tru}$ is the true (channel) interarrival amplitude associated with the targeted (for detection) radionuclide, $\xi_\tau(n)$ is the raw EMS photon arrival interarrival measurement, $\kappa_{\overline{\alpha}}$ is the respective confidence coefficient with associated confidence level $\overline{\alpha}$ and $\sigma_\tau$ is the associated standard deviation associated with the variance of the interarrival. Since the estimated interarrival time ($\hat{\tau}_m$) is not the actual source interarrival, we use two methods of obtain the estimate at the ADC output from the arrival time itself. The first method is to use a simple transport model with calibration data obtain prior to actual deployment processing while the second is based on performing a maximum likelihood estimate based on the rate parameter given by [11]

$$\lambda_m(n) = (1 - \beta)\lambda(n)$$ (57)

$$\hat{\tau}_m(n) = \frac{1}{\lambda(n)}$$

where β is a downscatter fraction of the higher energy photons estimated from the energy bins adjacent to $\epsilon_m$ of the calibration pulse-height spectrum. Using this estimate, when the photon interarrival is accepted as belonging to the $m^{th}$-channel, then $\xi_{\tau_m} \to \tau_m(n)$ and the raw measurements are then processed using the Bayesian techniques of the linear Kalman filter (LKF) and the particle filter (PF) developed in the previous section. However, if the time-tag does not match the true, then photon is rejected and no further processing occurs.

C.3.2 Energy Amplitude Level/Interarrival (Rate) Bayesian Estimation

Figure 7:
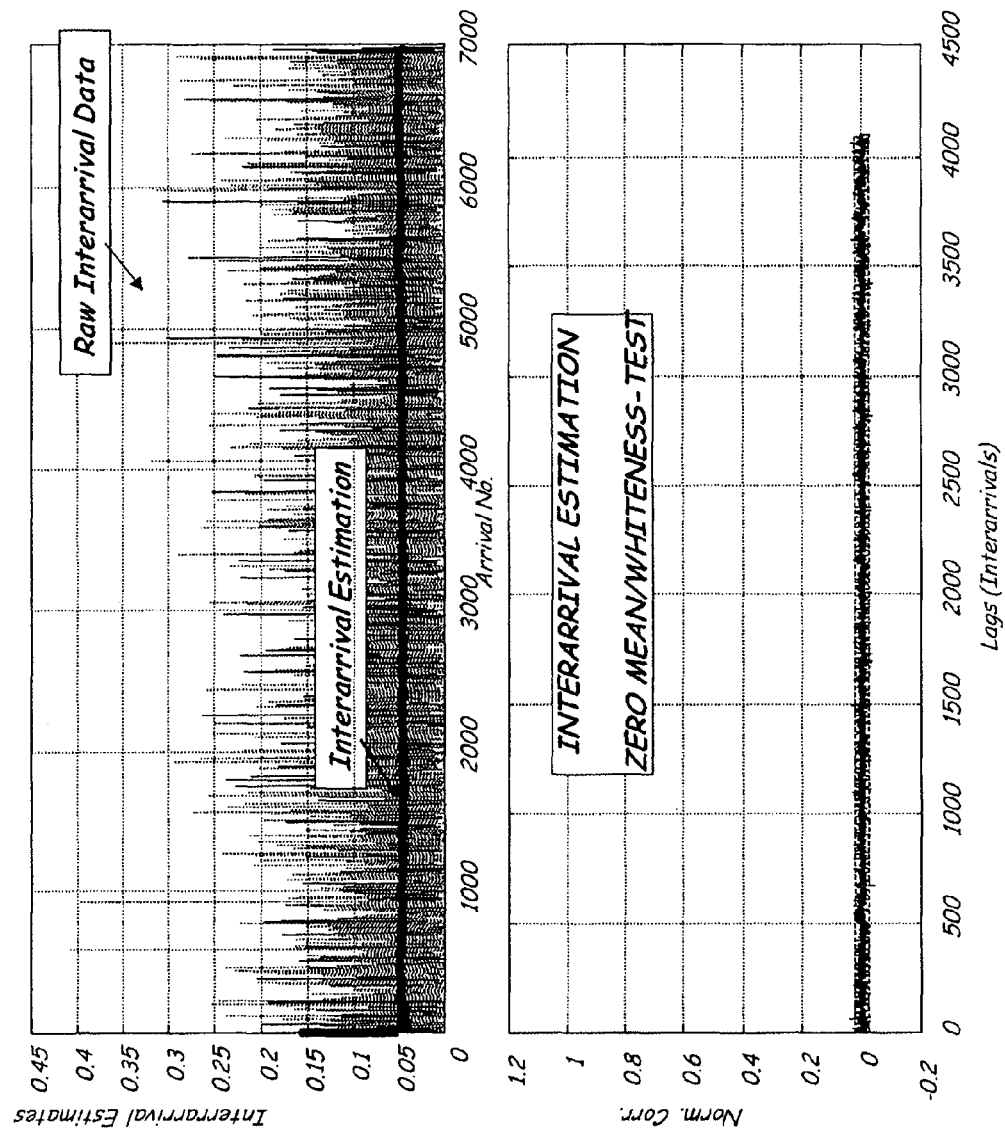
FIG. 7 shows the Bayesian model-based processing for 137Cs radionuclide zero-mean, whiteness testing: (a) Photon interarrival estimator (PF) (b) Zero-mealy whiteness testing (8.3×10−4<3.1×10−2)/4% out).
Figure 8:
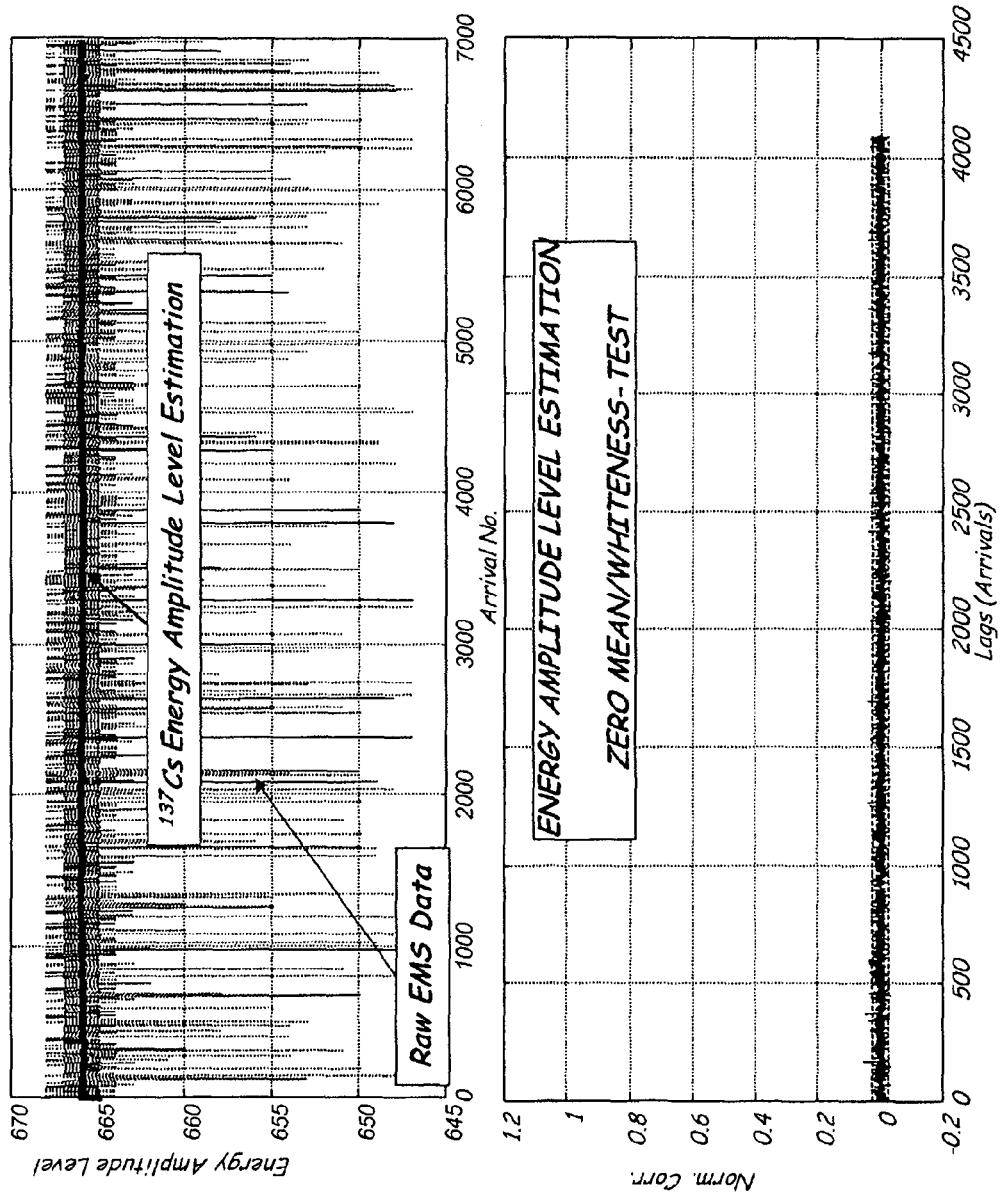
FIG. 8 shows the Bayesian model-based processing for 137Cs radionuclide: (a) Photon energy amplitude levels estimates. (b) Zero-mean/whiteness testing (8.7×10−19<3.1×10−2)/0.1% out).

In this section, we discuss the application of the Bayesian processors to the accepted photon data. As each photon is acquired and the measurement and arrival times are extracted both the associated energy amplitude level and interarrival time is sequentially updated using the LKF processor for the amplitude and PF processor for the interarrival time. A typical result of the processing for an entire run is shown in FIG. 8 for a cesium radionuclide ($^{137}$Cs). In 8a we set the energy amplitude level estimate and its zero-mean/whiteness test in FIG. 8b. Recall that for a LKF processor the resulting innovations sequence must be zero-mean and white (uncorrelated). This is the case for the energy amplitude estimates with $(8.7 \times 10^{-19} < 3.1 \times 10^{-2})/0.1\%$ out) as illustrated in the figure. We observe the corresponding interarrival time-tag estimate in FIG. 7. The interarrival estimates appear reasonable and the zero-mean/whiteness check validates its performance with $(8.3 \times 10^{-4} < 3.1 \times 10^{-2})/4\%$ out) quite good. In summary both estimators perform reasonably and are checked for validity by performing statistical whiteness tests which are optimal in the LKF case and reasonable for the PF case.

C.3.3 Radionuclide Parameter Estimation

Figure 9:
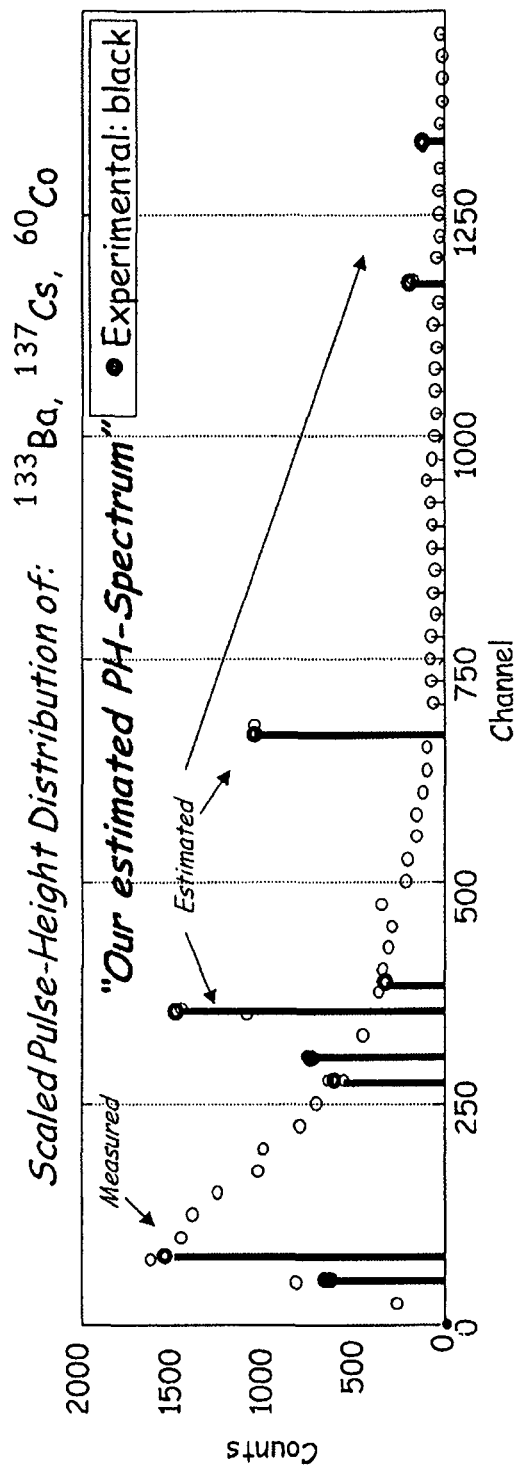
FIG. 9 shows the results of Bayesian parameter estimation for 133Ba,137Cs, 60Co radionuclides: (a) PHS estimation using high precision HGe commercial detector. (b) Parallel/distributed Bayesian processor using LKF and PF parameter estimators.
Figure 10:
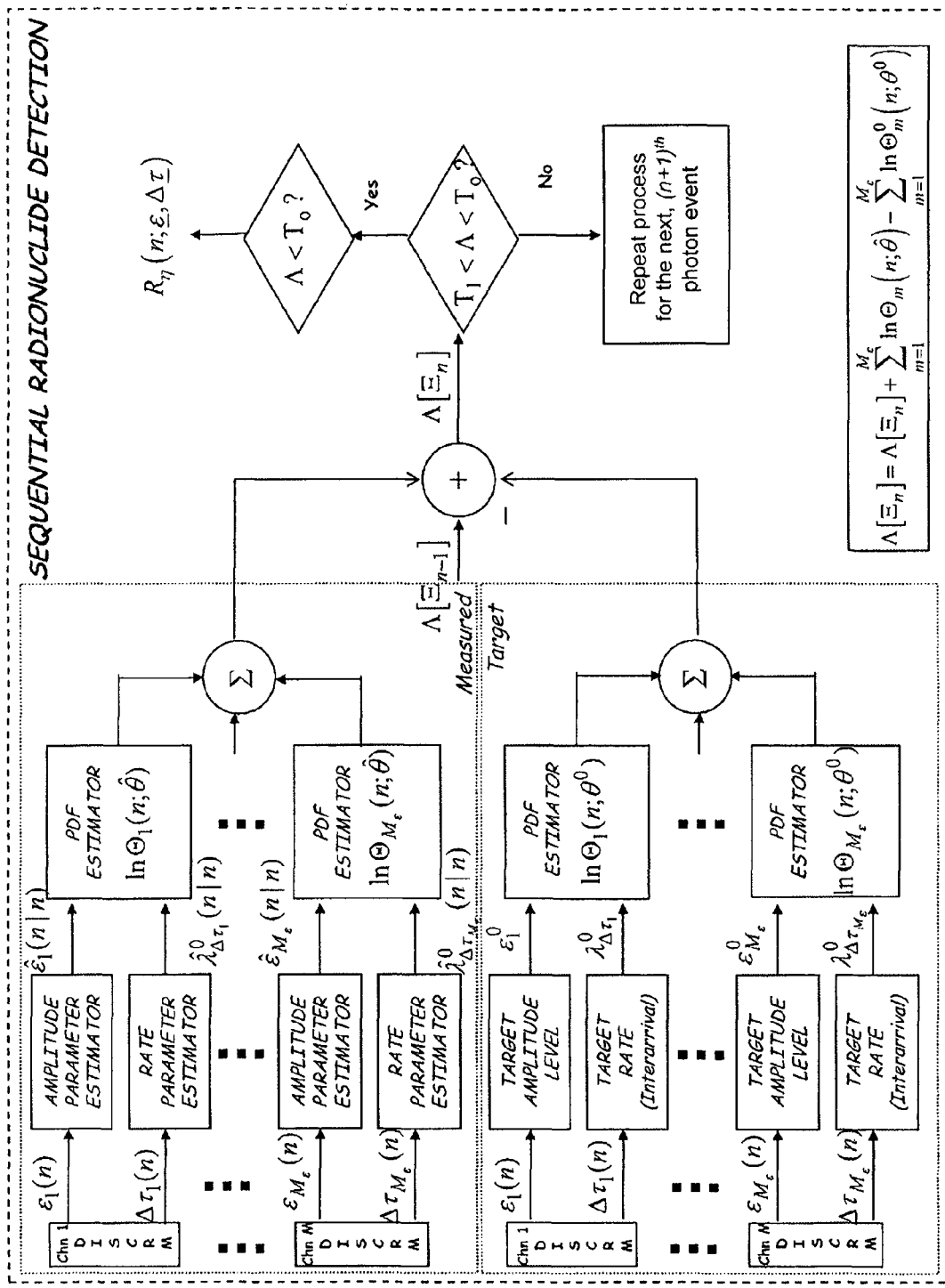
FIG. 10 shows the overall structure of the sequential Bayesian radionuclide detection technique (log-likelihood).

In this section we apply the sequential Bayesian parameter estimators to actual experimental data. The experimental set-up is shown in FIG. 10 along with the equipment consisting of sources, measurement instruments (some for monitoring) including a high purity germanium (HPG) commercial detector. The sources consisted of a set of known calibration sources with multiple lines and unknown background sources as shown in the PHS of FIG. 10. The results of the processing using the parallel/distributed processing scheme described in the previous sections are shown in FIG. 9 where we see the raw PHS measured by the commercial instrumentation as well as that by the sequential Bayesian processor. Clearly, the sequential processor is capable of performing the estimation quite well as demonstrated previously on the cesium source (see FIGS. 8, 9). Its PHS is uncluttered with undesirable energy counts and background primarily due to the processing scheme demonstrating its effectiveness over this controlled experimental data set.

C.3.4. Sequential Radionuclide Detection/Classification

The sequential radionuclide detector is constructed as discussed in Sec. 4.1 and Eq. 44. However, it is implemented in a channel-by-channel framework as depicted in FIG. 6. Basically, the individual distributions are calculated in parallel at each channel and then combined in the detector/classifier as illustrated for the specific distributions in FIG. 10 where the required parameters are replaced by their estimates. At each arrival after discrimination, the accepted channel photon, say $j^{th}$ is processed by the energy amplitude level and interarrival parameter estimators ($\hat{\theta}$) providing the input to the likelihood ratio along with the truth parameters ($\theta^o$) available from the tables to give $[\{\epsilon_m^o\},\{\Delta\tau_m^o\},\{\alpha_m^o\}]$; m=1, ..., $M_\epsilon$. Using the distribution relations developed for the joint parametric distributions, we have the likelihood ratio (as before)

$$L[\Xi_n] = \tag{58}$$

$$L[\Xi_{n-1}] \times \frac{\prod_{m=1}^{M_\epsilon} \frac{\alpha_m \hat{\lambda}_{\Delta\tau_m}(n|n)}{\sqrt{2\pi}\,\hat{\sigma}_{\epsilon_m}(n|n)} \exp\left\{\frac{-\hat{\lambda}_{\Delta\tau_m}(n|n)\Delta\tau_m(n)-(\epsilon_m(n)-\hat{\epsilon}_m(n|n))^2}{2\hat{\sigma}_{\epsilon_m}^2(n|n)}\right\}}{\prod_{m=1}^{M_\epsilon} \frac{\alpha_m^o \lambda_{\Delta\tau_m}^o}{\sqrt{2\pi}\,\sigma_{\epsilon_m^o}} \exp\left\{\frac{-\lambda_{\Box\tau_m}^o \Delta\tau_m(n)-(\epsilon_m(n)-\epsilon_m^o(n))^2}{2\sigma_{\epsilon_m^o}^2}ht\right\}}$$

In order to simplify notation somewhat, we define the following general functional form (see FIG. 10)

$$\Theta_m(n;\theta) := Pr(\Box\tau_m(n)|\Xi_{n-1},H_l) \times Pr(\epsilon_m(n)|I_m(k),\Xi_{n-1},H_l) \times Pr(I_m(k)|\Xi_{n-1},H_l) \tag{59}$$

and for our specific problem, we have under hypothesis $H_1$ $$\Theta_m(n;\hat{\theta}) = \tag{60}$$

$$\frac{\alpha_m \hat{\lambda}_{\Box\tau_m}(n|n)}{\sqrt{2\pi}\,\hat{\sigma}_{\epsilon_m}(n|n)} \exp\left\{\frac{-\hat{\lambda}_{\Box\tau_m}(n|n)\Box\tau_m(n)-(\epsilon_m(n)-\hat{\epsilon}_m(n|n))^2}{2\hat{\sigma}_{\epsilon_m}^2(n|n)}\right\}$$

and under hypothesis $H_0$ $$\Theta_m(n;\theta^o) = \frac{\alpha_m^o \lambda_{\Box\tau_m}^o}{\sqrt{2\pi}\,\sigma_{\epsilon_m^o}} \exp\left\{\frac{-\lambda_{\Box\tau_m}^o \Box\tau_m(n)-(\epsilon_m(n)-\epsilon_m^o)^2}{2\sigma_{\epsilon_m^o}^2}\right\} \tag{61}$$

Therefore, we can re-write Eq. 58 using this notation simply as:

$$L[\Xi_n] = L[\Xi_{n-1}] \times \frac{\prod_{m=1}^{M_\epsilon}\Theta(n;\hat{\theta})}{\prod_{m=1}^{M_\epsilon}\Theta(n;\theta^o)} \tag{62}$$

and taking logarithms of this expression, we obtain $$\Lambda[\Xi_n] = \Lambda[\Xi_{n-1}] + \sum_{m=1}^{M_\epsilon} \ln\Theta_m(n;\hat{\theta}) - \sum_{m=1}^{M_\epsilon} \ln\Theta_m^o(n;\theta^o) \tag{63}$$

giving the intermediate result $$\Lambda[\Xi_n] = \Lambda[\Xi_{n-1}] + \sum_{m=1}^{M_\epsilon} \ln\left(\frac{\alpha_m \hat{\lambda}_{\Box\tau_m}(n|n)}{\sqrt{2\pi}\,\hat{\sigma}_{\epsilon_m}(n|n)}\exp \tag{64}$$

$$\left\{-\hat{\lambda}_{\Box\tau_m}(n|n)\Box\tau_m(n) - \frac{(\epsilon_m(n)-\hat{\epsilon}_m(n|n))^2}{2\hat{\sigma}_{\epsilon_m}^2(n|n)}\right\}\right) - $$

$$\sum_{m=1}^{M_\epsilon} \ln\left(\frac{\alpha_m^o \lambda_{\Box\tau_m}^o}{\sqrt{2\pi}\,\sigma_{\epsilon_m^o}}\exp\left\{-\lambda_{\Box\tau_m}^o \Box\tau_m(n) - \frac{(\epsilon_m(n)-\epsilon_m^o)^2}{2\sigma_{\epsilon_m^o}^2}\right\}\right)$$

Figure 11:
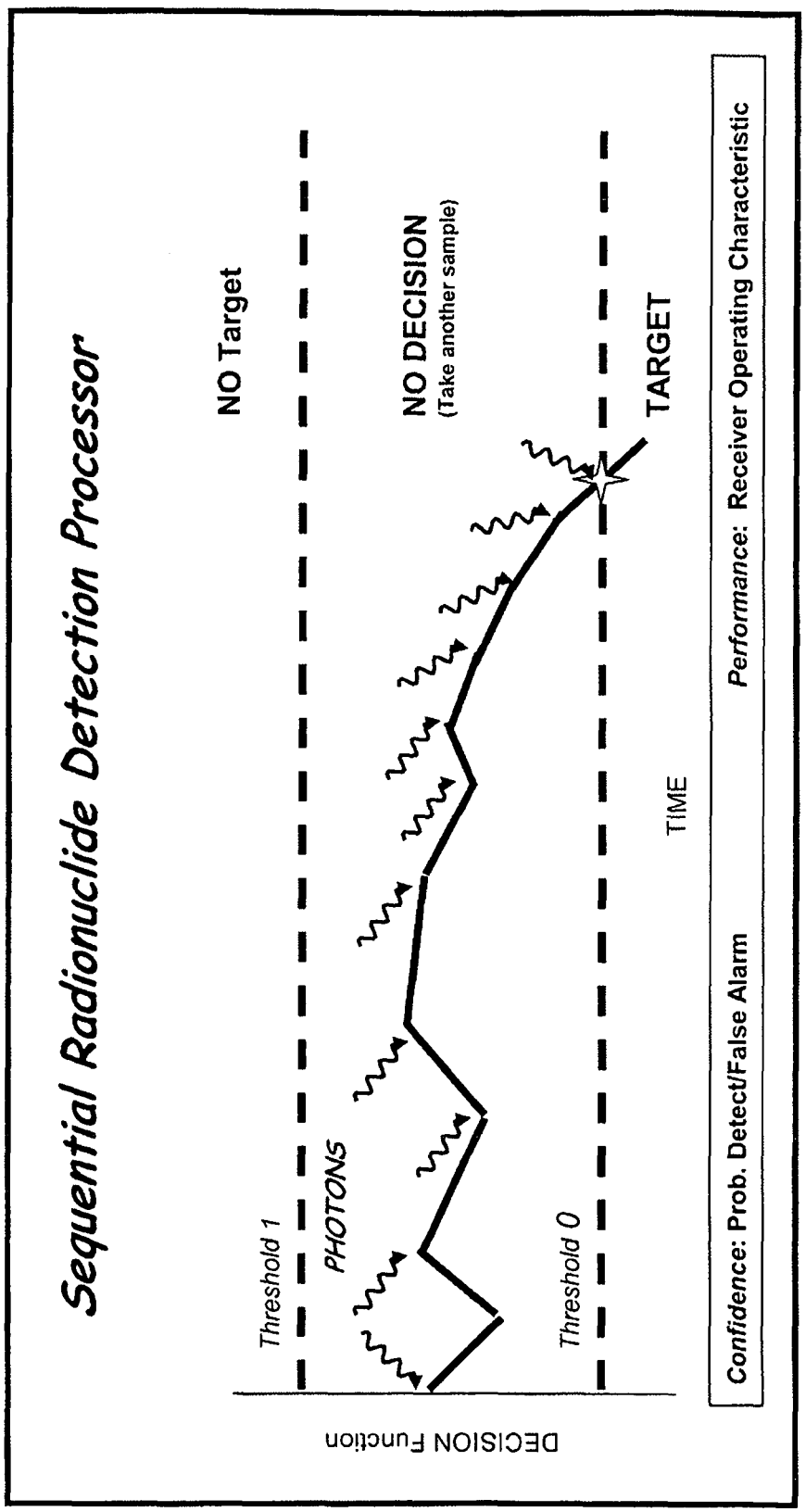
FIG. 11 shows the conceptual implementation of the sequential Bayesian radionuclide detection technique. As each individual photon is extracted, it is discriminated, estimated, the decision function (log-likelihood) calculated and compared to a threshold to "decide" if the threat radionuclide is present.

Combining similar terms, we obtain the final sequential log-likelihood ratio radionuclide detector specified by:

$$\Lambda[\Xi_n] = \Lambda[\Xi_{n-1}] + \sum_{m=1}^{M_\epsilon} \ln\left(\frac{\alpha_m^o \hat{\lambda}_{\Box\tau_m}(n|n)}{\sqrt{2\pi}\,\hat{\sigma}_{\epsilon_m}(n|n)}\right) - \tag{66}$$

$$\ln\left(\frac{\alpha_m^o \lambda_{\Box\tau_m}^o}{\sqrt{2\pi}\,\sigma_{\epsilon_m^o}}\right) + \left(\lambda_{\Box\tau_m}^o - \hat{\lambda}_{\Box\tau_m}(n|n)\right)\Box\tau_m(n) +$$

$$\frac{1}{2}\left(\frac{\epsilon_m(n)-\epsilon_m^o(n)}{\sigma_{\epsilon_m^o}}\right)^2 - \frac{1}{2}(\epsilon_m(n)-\hat{\epsilon}_m(n|n))r\hat{\sigma}_{\epsilon_m}(n|n))^2$$

with implementation depicted in the figure where we observe that after successful discrimination the parameters are estimated and employed to calculate the log-likelihood function as in Eq. 66. These are estimated channel-by-channel ($m^{th}$-channel) and the overall decision function implemented sequentially (in arrival time). The diagram shows the input photon measurement data (raw amplitude/interarrival) after discrimination as input to the individual channel parameter estimators. Once the parameters are estimated they are implemented in each channel log-likelihood partial calculation ($\Theta_m(n;\theta)$) and all of the partial sums are combined along with the previous (in arrival time) log-likelihood to sequentially update the new log-likelihood at time n. It is then compared to the threshold to see if a detection is possible. If not, the next photon is processed and the log-likelihood updated to see if a decision can be made. This sequential radionuclide process continues until there is enough data for a decision to made. Conceptually, we depict the sequential detector in FIG. 11.

D. APPENDIX

D.1. Statistics of EMS

Since the EMS is a random process, we must define the underlying assumptions and associated statistics for its to complete characterization. The number of arrivals in a given interval is Poisson distributed characterized by a Poisson counting process itesny 11, that is, if we define the counting increment for the $m^{th}$-source as $$N\Box_{\tau_m}(n) := N_{\tau_m}(n) - N_{\tau_m}(n-1) \text{ for } \tau_m(n-1) \leq t \leq \tau_m(n) \tag{61}$$

then the corresponding Poisson counting distribution is $$P[N_{\Box\tau_m}(n) = m] = \tag{62}$$

$$\frac{(\Lambda_{\tau_m}(n) - \Lambda_{\tau_m}(n-1))^m}{m!} \exp[-(\Lambda_{\tau_m}(n) - \Lambda_{\tau_m}(n-1))]$$

for m=0, ..., $N_\epsilon(m)$ with $\Lambda_{\tau_m}(n)>0$ the intensity function. Here it is assumed that the increments are independent and non-overlapping implying that the number of points in each interval $[\tau_m(n-1), \tau_m(n))$ is independent leading to the usual factorization of the joint distribution $$Pr[N_{\Box\tau_1}(n), \ldots, N_{\Box\tau_{M_\varepsilon-1}}(n), N_{\tau_{N_\varepsilon}}(n)] = \prod_{m=1}^{M_\varepsilon} Pr[N_{\Box\tau_m}(n)] \quad (63)$$

with the corresponding intensity function specified by $$\Lambda_{\tau_m}(n) = \int \lambda_m(\alpha) d\alpha \text{ or } \Lambda_{\tau_m}(n) = \lambda_m \times \Box \tau_m(n) \quad (64)$$

depending on the respective decay rate being inhomogeneous or homogeneous.

Clearly, since the EMS is the superposition of Poisson processes, then it is also a composite Poisson process [11] with parameters:

$$\lambda = \sum_{m=1}^{M_\varepsilon} \lambda_m, \varepsilon = \sum_{m=1}^{M_\varepsilon} \varepsilon_m, M_\varepsilon = \sum_{m=1}^{M_\varepsilon} N_\varepsilon(m) \quad (65)$$

for $\lambda$ the total decay rate, $\varepsilon$ the associated energy levels and $N_\varepsilon$ the total counts in the interval, $[t_o, T)$. Note that the composite decay rate is the superposition of all of the individual component rates as in Eq. 5. This follows directly from the fact that the sum of exponentially (Poisson) distributed variables are gamma (Poisson). We note that the (composite) EMS of the radionuclide directly contains information about $\lambda$, but not about its individual components—unless we can extract the monoenergetic representation (Eq. 6) from the measured data.

Since $\xi$ is a process characterized by a Poisson distribution, then the interarrival times, $\Delta\tau_m(n)$ associated with the $m^{th}$-monoenergetic source are exponentially distributed. That is, assuming a homogeneous Poisson process, we have $$Pr[N_{\Delta\tau_m}(n) = m] \sim P(\lambda_m \Delta\tau_m) \frac{(\lambda_m \Delta\tau_m)^m}{m!} \exp(-\lambda_m \Delta\tau_m) \quad (66)$$

and therefore, (65)

$$Pr[\Delta\tau_m = m] \sim E(\lambda_m) = \lambda_m \exp(-\lambda_m \Delta\tau_m) \quad (67)$$

with mean, $$\mu_{\Delta\tau_m} = \frac{1}{\lambda_m}$$

and variance, $$\sigma^2_{\Delta\tau_m} = \frac{1}{\lambda_m^2}.$$

Similarly, it is well-known (see Snyder, Theorem 2.3.1, [11]) that for a homogeneous Poisson counting process with intensity, $\lambda_m$ the interarrival times, $\Box\tau_m(n)$ are i.i.d and $E(\lambda_m \Box\tau_m(n))$. For an inhomogeneous Poisson process this property is no longer valid.

To complete the statistics of our component EMS representation, we have that the arrival (occurrence) times for a homogeneous Poisson process are gamma-distributed, that is, for the $\tau_m(n)$ arrival time, we have $$\Gamma(k, \tau_m) = Pr[\tau_m(n)] = \frac{(\lambda_m \tau_m(n))^{k-1}}{(k-1)!} \lambda_m \exp[-\lambda_m \tau_m(n)] \quad (68)$$

for $\tau_m(n) \geq 0$ with $E\{\tau_m(n)\} = \frac{n}{\lambda_m}$ and $\sigma^2_{\tau_m(n)} = \frac{n}{\lambda_m^2}$.

This completes the statistical description of the composite EMS in terms of its monoenergetic source decomposition. With this representation it is clear that when measuring the EMS, it is characterized by the following properties:

non-uniform arrival time samples, $\tau_m(n)$
monoenergetic source components, $\xi(n; \varepsilon_m(n), \tau_m(n))$ having their own unique decay rate, $\lambda_m$
unique energy level, $\varepsilon_m$
gamma distributed arrival times, $\tau_m(n)$, $\Gamma(k, \tau_m)$
Poisson distributed counts, $N_\varepsilon(m)$, $P(N_\varepsilon(n) = m)$
exponentially distributed interarrival times, $\Box\tau_m(n)$, $E(\lambda_m \Box\tau_m(n))$
composite decay rate, $\lambda$ Particle Filtering Particle filtering (PF) is a sequential Monte Carlo method employing the sequential estimation of relevant probability distributions using so-called "importance sampling" techniques incorporating distribution approximations with discrete random measures. The key idea is to represent the posterior distribution by a set of $N_p$ random samples, the particles, with associated weights, $\{x_i(t), W_i(t)\}$; $i=1, \ldots, N_p$, and compute the required Monte Carlo posterior estimates. As the number of particles becomes very large the MC representation becomes an equivalent characterization of the analytical description of the posterior distribution converging to the optimal Bayesian estimate. In PF, continuous distributions are approximated by discrete random measures composed of these weighted particles or point masses where the particles are actually samples of the unknown or hidden states from the state-space representation and the weights are the "probability masses" estimated using the Bayesian recursions. Thus, associated with each particle, $x_i(t)$ is a corresponding weight or (probability) mass, $W_j(t)$. Knowledge of this random measure characterizes an estimate of the instantaneous (at time t) filtering posterior distribution, $$Pr(x(t) | Y_t) \approx \sum_{i=1}^{N_p} W_i(t) \delta(x(t) - x_i(t))$$

Statistics are calculated across the ensemble of particle representations at each time-step to provide estimates of the states. For example, the minimum mean-squared error (MMSE) estimate is easily determined by averaging over $x_i$, since $$\hat{x}_{MMSE}(t) = \int x(t) Pr(x(t) | Y_t) dx \approx \int x(t) Pr(x(t) | Y_t) dx =$$
$$\int x(t) \left( \sum_{i=1}^{N_p} W_i(t) \delta(x(t) - x_i(t)) \right) dx = \sum_{i=1}^{N_p} W_i(t) x_i(t)$$

The maximum a-posteriori (MAP) estimate is simply determined by finding the sample corresponding to the maximum weight of $x_i(t)$ across the ensemble at each time-step as $$\hat{x}_{MAP}(t) = \underset{x_i(t)}{\operatorname{argmax}} Pr(x(t)\,|\,Y_t) \quad (69)$$

In Bayesian processing, the idea is to sequentially estimate the posterior, $Pr(x(t-1)|Y_{t-1}) \rightarrow Pr(x(t)|Y_t)$. The sequential importance sampling solution evolves from the recursive form for the importance distribution, $q(\bullet)$ as $$q(X_t|Y_t) := q(X_{t-1}|Y_{t-1}) \times q(x(t)|X_{t-1}, Y_t)$$

leading to the sequential expression for the importance weights as $$W(t) \propto \frac{Pr(X_t|Y_t)}{q(X_t|Y_t)} = \frac{Pr(Y_t|X_t) \times Pr(X_t)}{q(X_{t-1}|Y_{t-1}) \times q(x(t)|X_{t-1}, Y_t)} \quad (70)$$

$$W(t) = W(t-1) \times \frac{\overbrace{Pr(y(t)|x(t))}^{Likelihood} \times \overbrace{Pr(x(t)|x(t-1))}^{Transition}}{q(x(t)|X_{t-1}, Y_t)}$$

Similarly the state-space particle filter (SSPF) evolving from this sequential importance sampling construct follows directly. Recall that the generic state-space characterization representing the transition and likelihood probabilities is:

$$Pr(x(t)|x(t-1)) \Leftrightarrow A(x(t)|x(t-1))$$

$$Pr(y(t)|x(t)) \Leftrightarrow C(y(t)|x(t))$$

The generic state-space sequential importance sampling solution is given by $$x_i(t) \sqcap q(x(t)|X_{t-1}, Y_t) \quad (71)$$

$$W_i(t) = W_i(t-1) \times \frac{C(y(t)|x_i(t)) \times A(x_i(t)|x_i(t-1))}{q(x_i(t)|X_{t-1}(i), Y_t)}$$

$$W_i(t) = \frac{W_i(t)}{\sum_{i=1}^{N_p} W_i(t)}$$

Here we use the bootstrap particle filter based on sequential sampling-importance-resampling ideas (SIR) using the transition prior as its underlying importance proposal distribution, $$q_{prior}(x(t)|x(t-1), Y_t = Pr(x(t)|x(t-1)) = A(x(t)|x(t-1))$$

Thus, the corresponding weight only depends on the likelihood $$W(t) = \left(\frac{C(y(t)|x(t)) \times A(x(t)|x(t-1))}{A(x(t)|x(t-1))}\right) \times W(t-1) = W(t-1) \times C(y(t)|x(t))$$

One of the primary features as well as shortcomings of this technique is that in order to achieve convergence, it is necessary to resample at every time step to mitigate variance (weight) increases at each time step [34]. After resampling, the new weights become $$W(t) \rightarrow \frac{1}{N_p} \Rightarrow W(t) = C(y(t)|x(t))$$

The bootstrap particle filter algorithm is given by:
Generate the initial state, $x_i(0)$
Generate the process noise, $w_i(t)$
Generate the particles, $x_i(t) = A(x_i(t-1), u(t-1), w_i(t-1))$—the prediction-step
Generate the likelihood, $C(y(t)|x_i(t))$ using the current particle and measurement—the update step
Resample the set of particles retaining and replicating those of highest weight (probability), $x_i(t) \Rightarrow \hat{x}_i(t)$
Generate the new set, $$\{\hat{x}_i(t), \hat{W}_i(t)\} \text{ with } \hat{W}_i(t) = \frac{1}{N_p}$$

E. REFERENCES

The following cited references are incorporated by reference herein in their entirety:
[2] G. F. Knoll, Radiation Detection and Measurement, 3rd Ed., (Hoboken N.J.: John Wiley, 2000).
[11] D. L. Snyder and M. I. Miller, Random Point Process in Time and Space. (New York: Springer-Verlag, 1991).
[12] C. Andrieu, E. Barat and A. Doucet, Bayesian deconvolution of noisy filtered point processes, IEEE Trans. Sig. Proc., Vol. 49, 2001.
[14] A. Doucet and P. Duvaut, Bayesian estimation of state space models applied to deconvolution of Bernoulli-Gaussian processes, Signal Process., Vol. 57, 1997.
[16] S. Gulam Razul, W. J. Fitzgerald and C. Andrneu, Bayesian model selection and parameter estimation of nuclear emission spectra using RJMCMC, Nucl. Instrum. And Methods in Physics Res. A, Vol. 497, 2003.
[21] K. Sale, J. Candy, E. Breitfeller, B. Guidry, D. Manatt, T. Gosnell and D. Chambers, "A Bayesian sequential approach to spectroscopic portal system decisions" SPIES Confr. Proceed., 2007.
[22] J. Candy, K. Sale, B. Guidry, E. Breitfeller, D. Manatt, D. Chambers and A. Meyer, "Bayesian processing for the detection of radiactive contraband from uncertain measurements," IEEE CAMSAC Confr., 2007.

While particular embodiments and parameters have been described and/or illustrated, such are not intended to be limiting. Modifications and changes may become apparent to those skilled in the an, and it is intended that the invention be limited only by the scope of the appended claims.

We claim:
1. A photon-by-photon sequential radionuclide detection method comprising:
detecting an event mode sequence (EMS) comprising a sequence of measured photon events each uniquely characterized by an energy amplitude-interarrival time parameter pair;
for an $n^{th}$ photon event of the EMS:
selecting a monoenergy processing channel from a set of parallel monoenergy processing channels derived from a monoenergetic decomposition of a target radionuclide into monoenergetic sources in which to process the $n^{th}$ photon event, said selection based on a determination that both of the energy amplitude and interarrival time values of the $n^{th}$ photon event satisfy respective energy amplitude and interarrival time confidence interval conditions of the selected monoenergy channel;
upon selecting the monoenergy channel, using a sequential Bayesian processor of said selected monoenergy channel to update energy amplitude and interarrival time parameter estimates with the measured energy amplitude and interarrival time values of the nth photon event;

using the updated amplitude and interarrival time parameter estimates to update a measured probability density function (PDF) estimate for the target radionuclide;

determining whether a sequential likelihood ratio satisfies one of two threshold conditions signifying that the EMS is either identified as the target radionuclide or as not the target radionuclide, wherein said sequential likelihood ratio is based on a previous sequential likelihood ratio for a previous $(n-1)^{th}$ photon event, the sum of all updated measured PDF estimates produced as output from the set of parallel monoenergy channels, and the sum of all a-priori PDF estimates which are produced in parallel with the updated measured PDF estimates and based on expected amplitude level and interarrival time values of the target radionuclide; and upon determining that one of the two threshold conditions is satisfied, providing notification of the corresponding result, else repeating from the monoenergy selection step for the next $(n+1)^{th}$ photon event of the EMS until one of the two threshold conditions is satisfied.

2. The radionuclide detection method of claim 1, wherein the step of updating the energy amplitude parameter estimate is performed using a linear Kalman filter.

3. The radionuclide detection method of claim 1, wherein the step of updating the interarrival time parameter estimate is performed using a bootstrap particle filter.

4. A radionuclide detection system comprising:

a detector for detecting an event mode sequence (EMS) comprising a sequence of measured photon events each uniquely characterized by an energy amplitude-interarrival time parameter pair;

a set of parallel monoenergy processing channels derived from a monoenergetic decomposition of a target radionuclide into monoenergetic sources, each monoenergy processing channel comprising:

an energy line discriminator module for determining if an energy amplitude value of an $n^{th}$ photon event satisfies a channel-specific energy amplitude confidence interval condition, and rejecting the photon event if the condition is not satisfied;

an interarrival time discriminator module for determining, based upon acceptance of the photon event by the energy line discriminator module, if an interarrival time value of the $n^{th}$ photon event satisfies a channel-specific interarrival time confidence interval condition, and rejecting the photon event if the condition is not satisfied;

an energy amplitude parameter estimator module including a sequential Bayesian processor for updating energy amplitude parameter estimates with the measured energy amplitude and interarrival time values of the nth photon event;

an interarrival time parameter estimator module including a sequential Bayesian processor for updating interarrival time parameter estimates with the measured energy amplitude and interarrival time values of the nth photon event; and a measured probability density function (PDF) estimator module for using the updated amplitude and interarrival time parameter estimates to update a measured probability density function (PDF) estimate for the target radionuclide;

a sequential likelihood ratio processor module for determining whether a sequential likelihood ratio satisfies one of two threshold conditions signifying that the EMS is either identified as the target radionuclide or as not the target radionuclide, wherein said sequential likelihood ratio is based on a previous sequential likelihood ratio for a previous $(n-1)^{th}$ photon event, the sum of all updated measured PDF estimates produced in all the monoenergy channels, and the sum of all a-priori PDF estimates which are produced in parallel with the updated measured PDF estimates and based on expected amplitude level and interarrival time values of the target radionuclide, wherein upon determining that one of the two threshold conditions is satisfied the sequential likelihood processor provides notification of the corresponding result; and a channel input module for providing the set of parallel monoenergy processing channels with a next $(n+1)^{th}$ photon event and its energy amplitude-interarrival time parameter pair values for processing until the sequential likelihood ratio processor module determines that one of the two threshold conditions is satisfied.

5. The radionuclide detection system of claim 4, wherein the step of updating the energy amplitude parameter estimate is performed using a linear Kalman filter.

6. The radionuclide detection system of claim 4, wherein the step of updating the interarrival time parameter estimate is performed using a bootstrap particle filter.

* * * * *